US012745057B2

(12) United States Patent
Arachchige Dona et al.

(10) Patent No.: US 12,745,057 B2
(45) Date of Patent: Sep. 22, 2026

(54) WIRELESS BASED OCCUPANCY DETECTION AND ACTIVITY MONITORING

(71) Applicants: Sakila Sandeepani Jayaweera Samaranayake Arachchige Dona, Atlanta, GA (US); Muhammed Zahid Ozturk, Rockville, MD (US); Beibei Wang, McLean, VA (US); Yuqian Hu, Sunnyvale, CA (US); K. J. Ray Liu, Potomac, MD (US)

(72) Inventors: Sakila Sandeepani Jayaweera Samaranayake Arachchige Dona, Atlanta, GA (US); Muhammed Zahid Ozturk, Rockville, MD (US); Beibei Wang, McLean, VA (US); Yuqian Hu, Sunnyvale, CA (US); K. J. Ray Liu, Potomac, MD (US)

(73) Assignee: Origin Research Wireless, Inc., Rockville, MD (US)

( * ) Notice: Subject to any disclaimer, the term of this patent is extended or adjusted under 35 U.S.C. 154(b) by 0 days.

(21) Appl. No.: 19/390,664

(22) Filed: Nov. 16, 2025

(65) Prior Publication Data

US 2026/0075382 A1 Mar. 12, 2026

Related U.S. Application Data

(63) Continuation-in-part of application No. 19/260,558, filed on Jul. 6, 2025, and a continuation-in-part of (Continued)

(51) Int. Cl.
*H04W 4/021* (2018.01)
*G06N 3/0464* (2023.01)
*H04W 4/029* (2018.01)

(52) U.S. Cl.
CPC .......... *H04W 4/021* (2013.01); *G06N 3/0464* (2023.01); *H04W 4/029* (2018.02)

(58) Field of Classification Search
CPC ..... H04W 4/021; H04W 4/029; G06N 3/0464
See application file for complete search history.

(56) References Cited

U.S. PATENT DOCUMENTS 11,132,780 B2 * 9/2021 Xie ...................... G06V 10/764
2019/0325605 A1 * 10/2019 Ye ........................... G06N 3/08

(Continued)

*Primary Examiner* — Christopher M Brandt
(74) *Attorney, Agent, or Firm* — Slater Matsil, LLP

(57) ABSTRACT

Examples for wireless based occupancy detection are described. In one example, a described method comprises: transmitting, by each of a plurality of transmitters, a respective wireless signal through a wireless channel of a venue; receiving, by a receiver, the respective wireless signal, the received wireless signal different from the transmitted wireless signal due to the wireless channel and a motion of a user when the user is present in the venue; obtaining a plurality of time series of channel information (TSCI) of the wireless channel; computing a plurality of autocorrelation function (ACF) segments based on the plurality of TSCI; generating a plurality of feature maps using a first deep learning model that is shared by the plurality of ACF segments, wherein each ACF segment is input into the first deep learning model individually to generate a respective feature map; inputting the plurality of feature maps together into a second deep learning model to generate an aggregate representation that is independent of a quantity and locations of the transmitters; computing a probability of user presence based on the aggregate representation; and detecting a presence of the user in the venue based on a threshold and the probability of user presence.

20 Claims, 16 Drawing Sheets

Related U.S. Application Data application No. 19/004,301, filed on Dec. 28, 2024, and a continuation-in-part of application No. 18/991,629, filed on Dec. 22, 2024, and a continuation-in-part of application No. 18/991,634, filed on Dec. 22, 2024, and a continuation-in-part of application No. 18/991,632, filed on Dec. 22, 2024, now Pat. No. 12,493,666, and a continuation-in-part of application No. 18/391,529, filed on Dec. 20, 2023, and a continuation-in-part of application No. 18/108,563, filed on Feb. 10, 2023, and a continuation-in-part of application No. 17/838,228, filed on Jun. 12, 2022, and a continuation-in-part of application No. 17/838,231, filed on Jun. 12, 2022, and a continuation-in-part of application No. 17/540,156, filed on Dec. 1, 2021, and a continuation-in-part of application No. 17/149,625, filed on Jan. 14, 2021.

(60) Provisional application No. 63/902,471, filed on Oct. 20, 2025, provisional application No. 63/799,327, filed on May 2, 2025, provisional application No. 63/721,406, filed on Nov. 15, 2024.

(56) References Cited

U.S. PATENT DOCUMENTS

2019/0349715 A1* 11/2019 Ghourchian ............ H04W 4/33
2020/0163590 A1* 5/2020 Lin ....................... A61B 5/1117
2022/0155096 A1* 5/2022 Kim ....................... G06V 20/54

* cited by examiner

1600

WIRELESS BASED OCCUPANCY DETECTION AND ACTIVITY MONITORING

CROSS-REFERENCE TO RELATED APPLICATIONS

The present application hereby incorporates by reference the entirety of the disclosures of, and claims priority to, each of the following cases:

(a) U.S. patent application Ser. No. 17/149,625, entitled "METHOD, APPARATUS, AND SYSTEM FOR WIRELESS MONITORING WITH MOTION LOCALIZATION", filed on Jan. 14, 2021;

(b) U.S. patent application Ser. No. 17/540,156, entitled "METHOD, APPARATUS, AND SYSTEM FOR POSITIONING AND POWERING A WIRELESS MONITORING SYSTEM", filed on Dec. 1, 2021;

(c) U.S. patent application Ser. No. 17/838,228, entitled "METHOD, APPARATUS, AND SYSTEM FOR WIRELESS SENSING BASED ON CHANNEL INFORMATION", filed on Jun. 12, 2022;

(d) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022;

(e) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023;

(f) U.S. patent application Ser. No. 18/391,529, entitled "METHOD, APPARATUS, AND SYSTEM FOR WIRELESS HUMAN AND NON-HUMAN MOTION", filed on Dec. 20, 2023;

(g) U.S. patent application Ser. No. 18/991,634, entitled "WIRELESS SENSING IN NETWORK OF NETWORKS WITH CODED ADDRESSES TO IDENTIFY ORIGINATING DEVICES", filed on Dec. 22, 2024;

(h) U.S. patent application Ser. No. 18/991,629, entitled "WIRELESS SENSING USING MEASUREMENT ENHANCEMENT", filed on Dec. 22, 2024;

(i) U.S. patent application Ser. No. 18/991,632, entitled "WIRELESS SENSING USING CLASSIFIER PROBING AND REFINEMENT", filed on Dec. 22, 2024;

(j) U.S. patent application Ser. No. 19/004,301, entitled "HIGH RESOLUTION HUMAN IMAGING USING NEURAL NETWORK", filed on Dec. 28, 2024;

(k) U.S. patent application Ser. No. 19/260,558, entitled "WIRELESS BASED OCCUPANCY DETECTION", filed on Jul. 6, 2025;

(l) U.S. Provisional Patent application 63/721,406, entitled "METHOD, APPARATUS AND SYSTEM FOR WIRELESS SENSING", filed on Nov. 15, 2024;

(m) U.S. Provisional Patent application 63/799,327, entitled "DEEP LEARNING BASED WIRELESS SENSING WITH WIRELESS-SPECIFIC DATA AUGMENTATION", filed on May 2, 2025;

(n) U.S. Provisional Patent application 63/902,471, entitled "WIRELESS BASED OCCUPANCY DETECTION AND ACTIVITY MONITORING", filed on Oct. 20, 2025.

TECHNICAL FIELD

The present teaching generally relates to occupancy detection. More specifically, the present teaching relates to wireless based occupancy detection and activity monitoring.

BACKGROUND

Occupancy detection, e.g. human in-house occupancy detection, has become an essential technology in modern society aimed at improving energy efficiency and occupant comfort. This technology enables the control of heating, ventilation, and air conditioning (HVAC) systems, lighting, and other smart energy and resource optimization applications, thereby reducing energy consumption and costs. In addition, occupancy detection can enhance security and safety measures by identifying unauthorized presence. Conventional approaches for occupancy detection, such as cameras, PIR sensors, RFID sensors, and motion sensors, are often not cost-effective due to the need for additional installation. They are also privacy-invasive and suffer from low accuracy.

With the ubiquitous availability of IoT smart devices, using WiFi for occupancy detection has become a popular solution due to its convenience, cost-effectiveness, privacy-preserving capabilities, and extensive coverage. However, existing WiFi sensing applications cannot identify static humans, such as people in sleep, as detection is only based on motion characteristics. Even though breathing detection in the absence of motion can be used to detect static human targets, detecting breathing requires high-quality CSI, usually extracted from 5 GHz devices with at least 40 MHz bandwidth. However, many IoT devices do not provide the necessary CSI quality for accurate breathing detection. Moreover, model-based WiFi sensing approaches based on interpretable statistics such as motion and breathing cannot work well in increasingly complex environments due to other motion sources creating noise and interference.

SUMMARY

The present teaching generally relates to occupancy detection. More specifically, the present teaching relates to wireless based occupancy detection and activity monitoring.

In one embodiment, a method for wireless based occupancy detection is described. The method comprises: transmitting, by each of a plurality of transmitters, a respective wireless signal through a wireless channel of a venue; receiving, by a receiver, the respective wireless signal from each of the plurality of transmitters through the wireless channel of the venue, wherein the received wireless signal differs from the transmitted wireless signal due to the wireless channel and a motion of a user when the user is present in the venue; obtaining a plurality of time series of channel information (TSCI) of the wireless channel, wherein each of the plurality of TSCI is generated based on the received wireless signal from a respective transmitter of the plurality of transmitters; computing a plurality of autocorrelation function (ACF) segments based on the plurality of TSCI, wherein each of the plurality of ACF segments is computed based on CI of a respective TSCI of the plurality of TSCI; generating a plurality of feature maps using a first deep learning model that is shared by the plurality of ACF segments, wherein each of the plurality of ACF segments is input into the first deep learning model individually to generate a respective feature map of the plurality of feature maps; inputting the plurality of feature maps together into a second deep learning model to generate an aggregate representation that is independent of a quantity and locations of the plurality of transmitters; computing a probability of user presence based on the aggregate representation; and detecting a presence of the user in the venue based on a threshold and the probability of user presence.

In another embodiment, a device for wireless based occupancy detection is described. The device comprises: a receiver and a processor. The receiver is configured to receive a respective wireless signal from each of a plurality of transmitters through a wireless channel of a venue. The received wireless signal differs from the transmitted wireless signal due to the wireless channel and a motion of a user when the user is present in the venue. The processor is configured to: obtain a plurality of time series of channel information (TSCI) of the wireless channel, wherein each of the plurality of TSCI is generated based on the received wireless signal from a respective transmitter of the plurality of transmitters, compute a plurality of autocorrelation function (ACF) segments based on the plurality of TSCI, wherein each of the plurality of ACF segments is computed based on CI of a respective TSCI of the plurality of TSCI, generate a plurality of feature maps using a first deep learning model that is shared by the plurality of ACF segments, wherein each of the plurality of ACF segments is input into the first deep learning model individually to generate a respective feature map of the plurality of feature maps, input the plurality of feature maps together into a second deep learning model to generate an aggregate representation that is independent of a quantity and locations of the plurality of transmitters, compute a probability of user presence based on the aggregate representation, and detect a presence of the user in the venue based on a threshold and the probability of user presence.

In yet another embodiment, a system for wireless based occupancy detection is described. The system comprises: a plurality of transmitters each of which is configured to transmit a respective wireless signal through a wireless channel of a venue, a receiver and a processor. The receiver is configured to receive the respective wireless signal from each of the plurality of transmitters through the wireless channel of the venue. The received wireless signal differs from the transmitted wireless signal due to the wireless channel and a motion of a user when the user is present in the venue. The processor is configured to: obtain a plurality of time series of channel information (TSCI) of the wireless channel, wherein each of the plurality of TSCI is generated based on the received wireless signal from a respective transmitter of the plurality of transmitters, compute a plurality of autocorrelation function (ACF) segments based on the plurality of TSCI, wherein each of the plurality of ACF segments is computed based on CI of a respective TSCI of the plurality of TSCI, generate a plurality of feature maps using a first deep learning model that is shared by the plurality of ACF segments, wherein each of the plurality of ACF segments is input into the first deep learning model individually to generate a respective feature map of the plurality of feature maps, input the plurality of feature maps together into a second deep learning model to generate an aggregate representation that is independent of a quantity and locations of the plurality of transmitters, compute a probability of user presence based on the aggregate representation, and detect a presence of the user in the venue based on a threshold and the probability of user presence.

Other concepts relate to software for implementing the present teaching on wireless based occupancy detection. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of example embodiments. These example embodiments are described in detail with reference to the drawings. These embodiments are non-limiting example embodiments, in which like reference numerals represent similar structures throughout the several views of the drawings.

DETAILED DESCRIPTION

Figure 1:
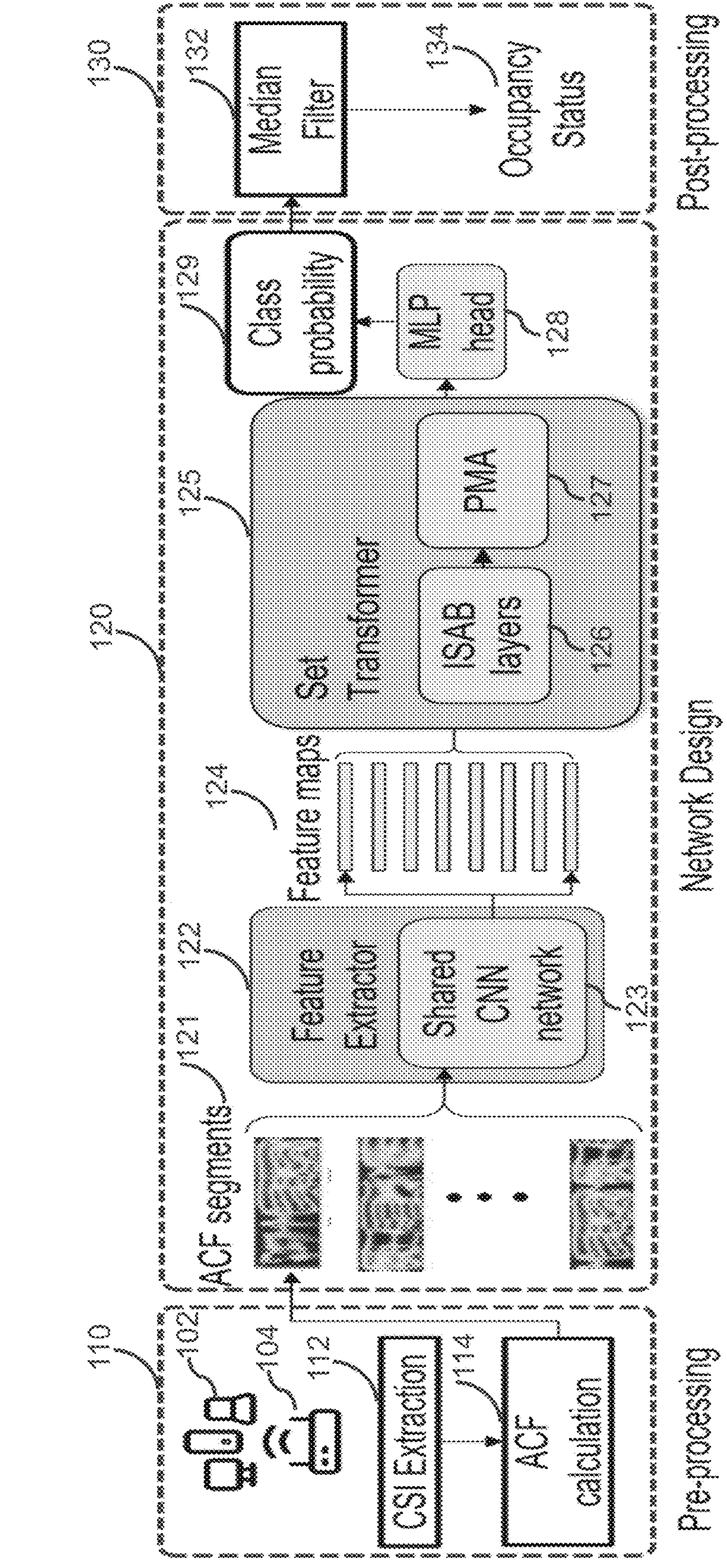
FIG. 1 illustrates an example framework of a system for wireless based occupancy detection, according to some embodiments of the present disclosure.

The symbol "/" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless- enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g.

association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device).

They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device(s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e.g. channels/signals/rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferior/unsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/presence/movement/daily/activity/history/event.

Classifier may comprise linear/nonlinear/binary/multiclass/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/road/fluid flow/home/room/office/house/building/warehouse/storage/system/ventilation/fan/pipc/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/autocorrelation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, weighted average/robust/trimmed mean/arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/IQ-compensation settings, environment effect on wireless signal propagation, channel input-to-output transformation, stable behavior of environment, state profile, wireless channel measurements/received signal strength indicator (RSSI)/channel state information (CSI)/channel impulse response (CIR)/channel frequency response (CFR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long- term/historical/repetitive/repeated/repeatable/recurring/periodic/pseudoperiodic/regular/habitual/incremental/average/initial/final/current/past/future/predicted/changing/deviational/change/time/frequency/orthogonal/non- orthogonal/transform/decomposition/deterministic/stochastic/probabilistic/dominant/key/prominent/representative/characteristic/significant/insignificant/indicative/common/averaged/shared/typical/prototypical/persistent/abnormal/a brupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/example/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chair/air-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/hat/headwear/bag/purse/wallet/makeup/cosmetic/ornament/book/magazine/paper/ stationary/sig nage/poster/display/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. “Tracker Bot”). The other one of Type1/Type2 device may not move with object (e.g. “Origin Satellite”, “Origin Register”). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/govemment/community/seniors/elderly care/geriatric/space facility/terminal/hub, distribution center/store, machine/engine/device/assembly line/workflow, urban/rural/suburban/metropolitan area, staircase/escalator/elevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life- threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/video/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/or hub/local/edge/cloud server.

Task may also comprise: detect/recognize/monitor/locate/interpret/analyze/record/store user/visitor/intruder/object/pet, interact/engage/converse/dialog/exchange with user/object/visitor/intruder/human/baby/pet, detect/locate/localize/recognize/monitor/analyze/interpret/learn/train/respond/execute/synthesize/generate/record/store/summarize health/well-being/daily-life/activity/behavior/pattern/exercise/food-intake/restroom visit/work/play/rest/sleep/relaxation/danger/routine/timing/habit/trend/normality/normalcy/anomaly/regularity/irregularity/change/presence/motion/gesture/gait/expression/emotion/state/stage/voice/ command/instruction/question/query/music/sound/location/movement/fall-down/threat/discomfort/sickness/environment/, generate/retrieve/play/display/render/synthesize dialog/exchange/response/presentation/report/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), detect/check/monitor/locate/manage/control/adjust/configure/lock/unlock/arm/disarm/open/close/fully/partially/activate/turn on/off some system/device/object (e.g. vehicle/robot/drone/electrical/mechanical/air-conditioning/heating/ventilation/HVAC/lighting/cleaning/entertainment/IoT/security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/vacuum cleaner/assembly line/window/garage/door/blind/curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/response/warning/clarification/notification/report) automatically upon detection, do something for user automatically upon detecting user presence, turn on/off/wake/control/adjust/dim light/music/radio/TV/HiFi/STB/computer/speaker/smart device/air-conditioning/ventilation/heating system/curtains/light shades, turn on/off/pre-heat/control coffee-machine/hot-water-pot/cooker/oven/microwave oven/another cooking device, check/manage temperature/setting/weather forecast/telephone/message/mail/system check, present/interact/engage/dialog/converse (e.g. through smart speaker/display/screen: via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/channel, open curtain/blind, monitor user's mood, adjust lighting/sound environment according to mood/current/imminent event (e.g. do romantic lighting/music because user is scheduled to cat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/field/voice/music/song/dialog system, using visual tool such as TV/entertainment system/computer/notebook/tablet/display/light/color/brightness/patterns symbols, using haptic/virtual reality/gesture/tool, using smart device/appliance/material/furniture/fixture, using server/hub device/cloud/fog/edge server/home/mesh network, using messaging/notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from night-time to day-time profile, turn on bedroom light, turn on restroom light as user approaches restroom, check radio/streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/close garage door, turn on/off garage/driveway light, close/lock all windows/doors (if user forgets), turn off appliance (e.g. stove/microwave/oven), turn on/arm security system, adjust light/air-conditioning/heating/ventilation systems to "away" profile to save energy, and/or send alerts/reports/updates to user's smart phone.

Motion may comprise any of: no-motion, motion sequence, resting/non-moving motion, movement/change in position/location, daily/weekly/monthly/yearly/repeating/activity/behavior/action/routine, transient/time-varying/fall-down/repeating/repetitive/periodic/pseudo-periodic motion/breathing/heartbeat, deterministic/non-deterministic/probabilistic/chaotic/random motion, complex/combination motion, non-/pseudo-/cyclo-/stationary random motion, change in electro-magnetic characteristics, human/animal/plant/body/machine/mechanical/vehicle/drone motion, air-/wind-/weather-/water-/fluid-/ground/sub-surface/seismic motion, man-machine interaction, normal/abnormal/dangerous/warning/suspicious motion, imminent/rain/fire/flood/tsunami/explosion/collision, head/facial/eye/mouth/tongue/neck/finger/hand/arm/shoulder/upper/lower/body/chest/abdominal/hip/leg/foot/joint/knee/elbow/skin/below-skin/subcutaneous tissue/blood vessel/intravenous/organ/heart/lung/stomach/intestine/bowel/eating/breathing/talking/singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/ edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency- domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector- valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window(s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/user/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, cat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

In some embodiments, the present disclosure discloses a robust occupancy detection system using WiFi signals from IoT devices. In some embodiments, the system features an environment-independent neural network architecture with a shared neural network and a device order agnostic transformer block. Unlike many deep learning approaches, which do not generalize well to new environments as the input CSI highly depends on environmental changes, and therefore require additional resources to retrain their networks for every new environment, making it infeasible to use in real-world applications, the disclosed robust, environmentally independent occupancy detection system can operate based on environment-independent CSI features combined with a device order agnostic deep neural network and post-processing.

In some examples, the system may utilize already available IoT devices in homes, such as smart plugs, bulbs, hubs, and speakers, to collect CSI. Afterward, the CSI is passed through a stack of preprocessing layers, followed by the deep learning module that outputs present and non-present at every time stamp (e.g. at every second or every minute). The system design is invariant to the subject's location, orientation, and environmental changes. Moreover, the system can work with different numbers of devices with different types, bands, and carrier frequencies (e.g. 2.4 or 5 GHz) without losing any performance.

Designing a robust system based on deep learning for complex environmental settings presents several challenges. First, training and evaluating a model that generalizes to new environments require extensive data collection, as there are no publicly available datasets. One can collect data from different homes covering day-to-day activities and empty scenarios, which may induce another challenge: data imbalance. To address this issue, one can employ data augmentation methods unique to Wi-Fi modality, used to augment pre-processed CSIs with autocorrelation function. Combination of these two ensures environmental independence without requiring a large dataset to capture environmental diversity. Second, there is a significant diversity in devices, environments, and frequency bands. Environments can be apartments or houses, and devices may have different bandwidths and, therefore, different CSI dimensions. Additionally, users may have different number of devices without explicit ordering. To address these, one can first extract autocorrelation function from each CSI, followed by extracting independent features using a shared CNN network. This reduces computational overhead and ensures consistent feature maps from each device. The extracted features can then be fed into the transformer block, which uses an attention mechanism to weigh the importance of each device map without assuming any ordering. Further, the multilayer perceptron (MLP) layer can assign the class label based on the global context.

FIG. 1 illustrates an example framework of a system 100 for wireless based occupancy detection, according to some embodiments of the present disclosure. As shown in FIG. 1, the system 100 may include a pre-processing module 110, a network design module 120, and a post-processing module 130. In the pre-processing module 110, CSI extraction 112 can be performed based on wireless signals transmitted from one or more IoT devices 102 to a router 104. In general, the CSI may be any channel information (e.g. CSI, CFR, CIR, etc.) extracted based on wireless signals transmitted from a transmitter to a receiver. In some embodiments, the transmitter may serve as a Bot (e.g. Type1 device), while the receiver may serve as an Origin (e.g. Type2 device). A Bot can transmit a wireless signal to the Origin in a venue (e.g. a house), to obtain channel information of a wireless multipath channel based on the wireless signal, where the channel information of the wireless multipath channel may be impacted by motion/presence of any object/user in the venue.

CSI captures comprehensive details of the environment and dynamic objects, including the human body. As a result, deep learning-based designs that use CSI as input could be environment-dependent and require pre-training before deployment in a new environment. In order to remove the influence on the environment, the system can calculate the environment-independent statistic autocorrelation function (ACF).

In some embodiments, an ACF calculation 114 is performed in the pre-processing module 110 based on the extracted CSI to generate ACF segments 121. In some examples, there are N (which can be any positive integer) ACF segments, each corresponding to a respective IoT device or transmitter.

As shown in FIG. 1, the network design module 120 includes a feature extractor 122, a set transformer 125 and an MLP head 128. The feature extractor 122 may include a shared Convolutional Neural Network (CNN) model 123. Each ACF segment may be processed individually through the shared CNN model 123. CNN network can extract compact feature embedding for each ACF. The shared CNN architecture is designed to reduce computational overhead by utilizing a single CNN model to extract features from N ACF segments. This approach can not only minimize the computational resources required by reducing number of parameters and enabling batch processing, but also ensure that the features extracted from all ACF segments are consistent. Additionally, this shared architecture can facilitate the integration of ACF segments from new devices without the need for retraining the model. This adaptability is particularly beneficial in dynamic environments where the number of IoT devices may vary over time. Inputting the N ACF segments 121 into the shared CNN model 123 can result in N feature maps 124, where each of the N ACF segments 121 is input into the shared CNN model 123 individually and separate to generate a respective feature map of the N feature maps 124.

In some embodiments, the set transformer 125 may be used to aggregate per-device embedding extracted from the CNN network 123 into an invariant global representation. Inputting the N feature maps 124 together into the set transformer 125 can generate an aggregate representation that is independent of a quantity and locations of the plurality of IoT devices 102 or transmitters. The set transformer 125 may include Induced Set Attention Blocks (ISAB) layers 126 and a pooling multi-head attention (PMA) module 127. The ISAB layers 126 may model device interactions efficiently through learned induced points. In addition, the PMA 127 can adaptively focus on the most relevant devices, combining a set of embedding elements into a fixed-size representation that can be passed to the classification MLP head 128. The MLP head 128 can estimate a class probability 129 representing a likelihood that there is any user present in the venue.

In some embodiments, the set transformer is designed not to require knowledge of the devices' number, order or positions to determine occupancy. The system assumes that the user has placed a sufficient number of IoT devices to cover the whole venue. The lack of need for positioning information is due to the goal being general occupancy detection, not room-specific monitoring.

In some embodiments, the post-processing module 130 includes a median filter 132 which can be applied to the class probability 129 to smooth out transient spikes which are considered noise or non-genuine occupancy events. The median filter 132 may be configured to analyze the class probability 129 over a time window to generate a smoothed class probability. After comparing the smoothed class probability with a threshold, the system 100 can determine an occupancy status 134 of the venue. For example, the system 100 can detect presence of a user in the venue in accordance with a determination that the smoothed class probability is greater than the threshold. In some examples, the threshold is predetermined based on a receiver operating characteristic (ROC) curve that is generated based on detection rates and false alarm rates associated with various thresholds.

In some embodiments, the set transformer model is specifically designed to handle unordered and variable-sized sets. Applying this model to WiFi links and IoT devices is well-suited for occupancy detection using WiFi signals from exciting IoT devices, as each link provides an unordered view of the same environment, and the number of devices can vary from one house to another.

In some cases, data samples from large houses and apartments behave differently, with varying sensitivity levels. To model this behavior, the system can inject the domain information (whether the data is from a house or an apartment) into the set transformer as a conditioning token in the attention mechanism. The set transformer can learn slightly different behaviors depending on the environment type, to be more accurate on occupancy detection. This domain shift can enable few-shot adaptation or domain generalization without retraining any model (e.g. the feature extractor 122 or the set transformer 125).

In some embodiments, WiFi signals emitted from a transmitter can undergo multiple reflections and scatterings from various surfaces, including both static and dynamic objects. Information on such signal propagation is encapsulated in Channel State Information (CSI), which can be represented as $$H(t, f) = \sum_{l=1}^{L} \alpha_l(t) e^{-j2\pi f \tau_l(t)}$$

considering multipath effects. Here, $\alpha_l$ and $\tau_l$ are the complex amplitude and time delay of the l-th multipath component, respectively. In practice, many WiFi-based sensing systems employ the CSI power response $G(t, f)=|H(t, f)|^2$ as the CSI phase suffers from imperfect synchronization errors.

CSI captures comprehensive details of the environment and dynamic objects, including the human body. As a result, deep learning-based designs that use CSI as input directly are environment-dependent and require pre-training before deployment in a new environment. In order to remove the influence on the environment, one can calculate the environment-independent statistic autocorrelation function (ACF).

In some examples, the ACF of the CSI power G(t,f) can be calculated as $$\rho_G(\tau, f) = \frac{\mathrm{Cov}[G(t, f), G(t+\tau, f)]}{\mathrm{Var}[G(t, f)]}, \quad (1)$$

where $\tau$ represents the time lag. In order to better extract the features by enhancing the signal-to-noise ratio, the system can use the Maximum Ratio Combining (MRC) approach to accumulate ACF across the top X (e.g. top 10) subcarriers.

In some examples, the ACF depends solely on the power of dynamic scatterers, effectively characterizing motion of objects in the surroundings and identifying periodic patterns such as breathing in the absence of motion. Therefore, ACF serves as a valuable feature that captures details about human presence through motion and breathing.

Although one can directly extract human presence by analyzing the ACF and calculating a statistic called motion statistic and thresholding it, several challenges arise in the presence of interference. It is difficult to establish a single threshold that can filter out neighboring motion while still capturing smaller movements. Additionally, subtle breathing movements can be easily corrupted, making it challenging to identify static humans, particularly during nighttime.

In some examples, the system can calculate the ACF as described in Equation (1) and partition the data into 30-second segments to capture essential features related to human presence. Assuming one can use N IoT devices in the experimental setup, the system can obtain N ACF segments, each with dimensions $R^{TN} \times T$, where TN represents the number of time lags at each time instance, and T denotes the number of time instances in a segment.

In a practical example, one can utilize a maximum of 8 IoT devices connected to the router to collect CSI for occupancy detection. However, in some testing environments, the number of devices may be fewer than 8. To handle varying input sizes, one can fix the number of ACF segments to 8 and pad the rest with random noise when there are fewer than 8 devices.

In some cases, the dataset is highly imbalanced due to the limited amount of empty data, as people tend to spend most of their time at home, especially with remote and hybrid work schedules. To address this imbalance, the system can generate additional empty data by leveraging the spatial diversity of antenna locations. In an example device setup, each IoT device is equipped with 4 receiver (Rx) antennas. Instead of combining all the antennas using the MRC approach, the system can generate and use the ACF for each individual antenna link separately. This method can increase the amount of empty data by a factor of four, thereby enhancing the diversity of the dataset.

As discussed above, the disclosed neural network architecture may include a feature extractor and a transformer block. The feature extractor may use a shared CNN architecture, where each ACF segment is processed individually through the shared CNN model. In some examples, the shared CNN model may include three 2D convolutional layers with a kernel size of 5, followed by max-pooling layers. Non-linear activation functions ReLU may be applied after each convolution layer.

In some examples, the extracted 1D feature maps may then be fed into the transformer block. In some embodiments, the transformer block may have a different structure than that of the set transformer 125. For example, based on a normal transformer, the system can remove positional embedding from the transformer, to make the system device agnostic and utilize single transformer block. The transformer block may add a classification token (cls token) to the feature maps before inputting the feature maps to a multi-had attention layer in the transformer block. The cls token may be a learnable embedding with the same dimensionality as the feature maps. The cls token is added to the transformer to aggregate all the information from the feature maps and make the prediction. The attention map of the transformer block can measure the importance of each feature map and assigns a weight based on that. This allows the network to perform the final classification tasks based on highly sensitive ACF maps. The attention heads may then be passed through a dense layer to get the final context vector, and only the context token from the context vector is passed through the MLP head to estimate the final probability pc.

The above discussed set transformer is specifically designed to handle device order invariance, e.g. independent of device number, order or positions. In contrast, when using a conventional transformer, the positional embedding part needs to be removed to achieve device order invariance.

In some embodiments, during post-processing, while applying a 0.5 threshold on the final probability pc is a straightforward approach to estimate occupancy, the system can explore various thresholds (ranging from 0 to 1) to obtain the detection and false alarm rates, thereby generating the receiver operating characteristic (ROC) curve. Further, the system can apply a median filter over the past time instances T to determine the current state. The median filter may be a sliding window-based median filter applied to smooth out the output further to reduce the spiky false detections and sudden miss detection.

In some embodiments, to evaluate the performance of the system, one can carry out extensive experiments with data collected over 30~60 days to train and validate the system. The dataset may include challenging data from compact apartments, with neighboring motions that introduce false alarms and low quality IoT devices that cause miss detections, particularly during sleep. The system can demonstrate a high detection rate and a low false alarms different dates in the same environment or an unseen test environment. In some embodiments, the ROC curves are generated from two different window sizes. Increasing the window size can lead to an improved ROC curve, characterized by a lower FPR and higher detection rate. The window size can be chosen with respect to the application (e.g. HVAC control can accommodate slightly longer delays), and the maximum delay in this evaluation may be less than 1 minute.

As discussed above, a novel WiFi-based occupancy detection system is disclosed to utilize IoT devices in houses. The disclosed system utilizes a neural network-based design with a shared CNN layer as the feature extractor followed by a transformer block. The experimental results show that the implemented system can achieve a high detection rate and a low false alarm rate for test data in an unseen environment, surpassing other approaches significantly, while being robust against different environments and devices.

In some embodiments, when having a large enough dataset that covers many houses/apartments, one can directly use CSI instead of extracting the ACF feature metric. To inject domain information into the model, one can use various ways, such as: appending a domain embedding for each device after the CNN layers using feature-wise linear modulation, or concatenating with the global pooled representation after the PMA layer.

In the field of occupancy detection, child presence detection (CPD) is a vital technology for vehicles to prevent heat-related fatalities or injuries by detecting the presence of a child left unattended. Regulatory agencies around the world are planning to mandate CPD systems in the near future. However, existing solutions have limitations in terms of accuracy, coverage, and additional device requirements. While WiFi-based solutions can overcome the limitations, existing approaches struggle to reliably distinguish between adult and child presence, leading to frequent false alarms, and are often sensitive to environmental variations. Earlier CPD solutions based on indirect sensing methods, such as pressure, weight, heat, and capacitive sensors cannot distinguish human presence from objects and offer limited coverage. Later, PIR sensors were introduced for CPD, detecting children's motion inside the car. However, PIR sensors are sensitive to temperature and environmental impacts and cannot detect children during sleep due to the lack of motion. In contrast to the above methods, vision-based solutions provide higher accuracy, but they require additional hardware, increasing the deployment cost and energy consumption, and their accuracy relies highly on lighting conditions and cannot work well under obstructions. On the other hand, mmWave-based methods have gained popularity due to their privacy-preserving capabilities and easy installation. Nevertheless, they face challenges such as limited coverage due to the field of view (FoV) of mmWave antennas and the lack of vehicles equipped with mmWave chipsets. Contrary to the above solutions, WiFi sensing provides more extensive coverage, better privacy, and easy installation with no additional cost, as many new cars already have in-car WiFi. This opens up new in-car sensing applications such as driver monitoring and identification, child presence detection, and in-car seat occupancy detection. But some WiFi based systems cannot differentiate between adult and child presence, often triggering unnecessary false alarms when an adult is inside the vehicle. Additionally, severe environmental conditions can further degrade detection performance and increase false alarms, reducing system reliability in challenging situations.

To tackle the aforementioned challenges, the present disclosure discloses a novel deep learning system, DeepCPD, is disclosed for accurate child presence detection in smart vehicles. DeepCPD utilizes an environment-independent feature—the auto-correlation function (ACF) derived from WiFi channel state information (CSI)—to capture human-related signatures while mitigating environmental distortions. A transformer-based architecture, followed by a multilayer perceptron (MLP), is employed to differentiate adults from children by modeling motion patterns and subtle body size differences. To address the limited availability of in-vehicle child and adult data, the system utilizes a two-stage learning strategy that significantly enhances model generalization.

DeepCPD is a robust, environment-independent neural network designed to detect child-only presence by effectively distinguishing it from adult and empty-seat scenarios. DeepCPD can reliably identify children inside a vehicle regardless of their state (awake or asleep), even in complex real-world environments such as busy parking lots and under severe weather conditions like heavy rain or strong winds. However, designing such a system based on deep learning for different environments presents several challenges.

First, training and evaluating a model that generalizes to any car model requires extensive data collection, but collecting real-world WiFi data, particularly involving children, is challenging. This limitation hampers the model's ability to generalize to unseen vehicles, often necessitating pre-training for each specific car model. To address this, one can collect a comprehensive dataset using diverse antenna configurations and generate synthetic data through data augmentation techniques such as link permutation and link mix, which are introduced based on data pattern analysis to replicate real-world conditions. Furthermore, the system has a two-stage training strategy that leverages WiFi data collected in residential environments to mitigate the scarcity of motion-specific data.

Second, WiFi sensing deep neural networks that rely on raw channel state information (CSI) inputs often fail to suppress environmental influences, resulting in poor generalization to unseen environments. Achieving robust generalization typically requires a large volume of diverse training data, which takes additional efforts. Moreover, these models are highly dependent on the specific chipset used to collect the CSI, as variations in CSI quality across different hardware can significantly affect performance. In some embodiments, the system can use the first-order statistics, the Auto-Correlation Function (ACF) of the CSI, as input to the deep neural network. The ACF emphasizes dynamic features related to human motion and breathing patterns while suppressing the effects of static reflections caused by the environment, thereby enabling the network to be both environment and seat-location independent. This approach also reduces dependency on specific hardware, enabling easier deployment in real-world scenarios.

Third, extracting features relevant to child-adult classification remains a significant challenge. While ACF may be used for distinguishing presence from non-presence, the features required to differentiate between children and adults are less apparent. However, differences in movement patterns—such as the smaller spatial reflections from children's bodies and the larger reflections from adults—can be leveraged through spatial analysis. Additionally, children tend to exhibit more abrupt and faster motions, which can be captured through temporal motion patterns. To extract these relevant features, the system can employ an encoder specifically designed to capture periodic behaviors and cross-subcarrier dependencies. In particular, the system can adopt the encoder architecture originally developed for time-series forecasting, due to its ability to model long-range dependencies effectively.

DeepCPD is a novel deep learning framework that leverages an environment-independent ACF representation to capture spatial-temporal patterns for distinguishing child-only presence from adult and empty-seat scenarios. In some examples, a comprehensive in-car WiFi dataset may be established by collecting data across 30 different car models, covering child presence, adult presence, and empty scenarios. In some examples, two synthetic data generation techniques, link permutation and link mix, are specifically designed to mimic real-world variations relevant to the task. In some examples, a two-stage training procedure is used to address in-car data scarcity, using WiFi data collected in residential environments and validating the transferability of a pre-trained encoder across domains. DeepCPD can maintain high accuracy even under unfavorable environmental conditions, and is capable of detecting child-only presence.

In some embodiments, the method for extracting domain-independent features covers the channel state modeling, auto-correlation function (ACF) computation, and the efficient design of model inputs.

Within the confines of a vehicle, rich multi-path propagation of WiFi signals can undergo reflection, scattering, and diffraction off various surfaces, including human bodies, seats, and the vehicle's structure, before reaching the receiver. This results in the superposition of numerous multi-path components (MPC) at the receiver. Taking this multi-path effect into account, the channel state information (CSI) estimated on a subcarrier on frequency f at time t can be modeled as $$H(t, f) = \sum_{l \in \Omega_m} a_l(t) e^{-j2\pi f \tau_l(t)} + n(t, f),$$

where $\Omega_m$ denotes the set of multipath components, $a_l(t)$ and $\tau_l(t)$ denote the complex amplitude and the propagation delay of the $l^{th}$ multipath component, and n(t, f) represents the additive white Gaussian noise, with power of $\sigma^2(f)$.

Dynamic entities, such as humans, generate time-varying MPCs due to movement, while static objects contribute time-invariant MPCs. Notably, even stationary humans can induce time-varying MPCs, as WiFi signals are sensitive to the subtle movements caused by breathing. Consequently, the estimated CSI, H(t, f), can be reformulated as $$H(t, f) = \sum_{m \in \Omega_s} a_m(t) e^{-j2\pi f \tau_m(t)} + \sum_{n \in \Omega_d} a_n(t) e^{-j2\pi f \tau_n(t)} + n(t, f),$$

where $\Omega_s$ and $\Omega_d$ denote the time-invariant and time-variant multi-path components, respectively. $a_m(t)$, $a_n(t)$ are the complex amplitudes, $\tau_m$, $\tau_n$ are the time delay of the m and n-th MPC. Assuming that the time-invariant MPCs ($\Omega_s$) remain constant over time, the CSI can be approximated by $$H(t, f) \approx H_s(f) + \sum_{n \in \Omega_d} a_n(t) e^{-j2\pi f \tau_n(t)} + n(t, f),$$

where $H_s(f)$ is the sum of all static MPCs. In practical applications, as the phase information usually becomes unreliable due to synchronization offsets, the power response of the CSI may be given by $$G(t, f) = |H(t, f)|^2 = \mu(t, f) + \epsilon(t, f).$$

where μ(t, f) denotes the total power of received signal and ϵ(t, f) denotes the measurement noise, which can be modeled as additive white Gaussian noise (AWGN). Also, it can be assumed that μ(t, f) and ϵ(t, f) are uncorrelated with each other.

According to electromagnetic wave theory, the auto-correlation function (ACF) of the CSI power, ρ(t, f), is directly correlated with the power of dynamic scatterers, as follows:

$$\rho(\tau, f) = \frac{\text{cov}[G(t, f), G(t+\tau, f)]}{\text{var}[G(t, f)]} = \frac{E_d^2(f)}{E_d^2(f) + \sigma^2(f)} \rho_\mu(\tau, f) + \frac{\sigma^2(f)}{E_d^2(f) + \sigma^2(f)} \delta(\tau),$$

where τ is the time lag $$E_d^2(f)$$

and $\sigma^2(f)$ reflects the power of dynamic scatters and the power of measurement noise, respectively. $\rho_\mu(\tau, f)$ is the ACF of μ(t, f) and δ(τ) is the Dirac delta function.

In a dynamic environment, $$E_d^2 > 0,$$

while in a static environment, $$E_d^2 = 0$$

as there are no dynamic scatters. Therefore, $\lim_{\tau \to 0} \rho(\tau, f)$ is an excellent indicator for detecting motion. In practice, the direct measurement of the $\lim_{\tau \to 0} \rho(\tau, f)$ is not feasible due to the limitation of sampling frequency $F_s$. Thus, it can be approximated as $\lim_{\tau \to 0} \rho(t, f) \approx \rho(\tau = 1/F_s, f)$. Thus, motion statistics for the subcarrier f, $\psi_f$ can then be defined as, $$\psi_f = \rho(\tau = 1/F_s, f).$$

The ACF can be further viewed as a periodic signal if there is no motion but breathing. One can define the channel gain $$g(f) \triangleq \frac{E_d^2(f)}{E_d^2(f) + \sigma^2(f)}.$$

Then for $\tau \neq 0$, one can write the ACF as, $$\rho(\tau, f) = g(f)\rho_\mu(\tau, f).$$

With the existence of breathing, $\rho_\mu(\tau, f)$ exhibits a periodic pattern with peak values varying across each subcarrier f.

For a given WiFi link with $N_s$ subcarriers, one can calculate $N_s$ unique subcarriers with the length of l, where l represents the number of time lags. The length l is chosen to effectively capture human breathing patterns.

In some embodiments, one can analyze the CSI and ACF for three scenarios: an empty car, a child breathing and an adult breathing. Based on the CSI analysis for the empty car (a, d), adult presence (c, e), and child presence (b, f) across two car models: Model A (an SUV) and Model B (a sedan), the CSI patterns vary significantly even within the same class, making it challenging to train a generalized classification model. Furthermore, there is no significant difference between CSI data in the empty-car and the child-presence cases, as the child's breathing motion is subtle. Therefore, it is crucial to remove environmental influences and enhance the features to improve the system design.

To compute ACF from the most sensitive subcarrier f, the system can select the most sensitive subcarrier based on the motion statistic. ACF functions may serve as an environment-independent feature by suppressing static components and emphasizing dynamic features, which is valuable for developing a generalized model applicable across different vehicles. While model-based methods can capture some of these distinctions, motion-related ACF patterns can still appear similar across classes, making accurate classification difficult. In contrast, learning-based approaches can more effectively leverage the temporal and spatial characteristics of the ACF, allowing the network to distinguish subtle differences in body size and movement behaviors between children and adults.

Figure 2:
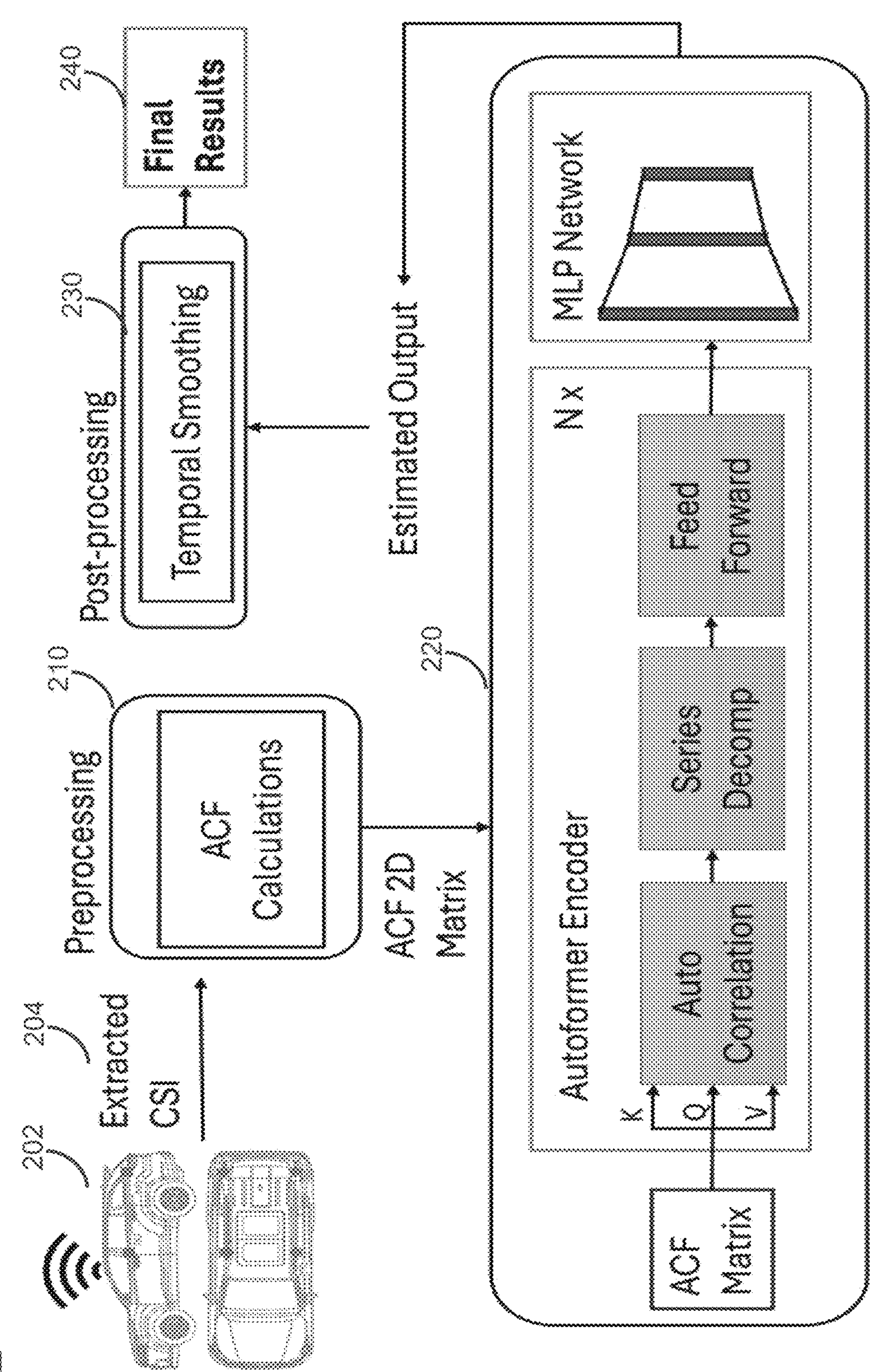
FIG. 2 illustrates an example system for child presence detection, according to some embodiments of the present disclosure.

FIG. 2 illustrates an example system 200 for child presence detection, according to some embodiments of the present disclosure. As depicted in FIG. 2, the system 200 is structured into three primary stages. In the first stage 210, the CSI time series 204 extracted from a car 202 can undergo pre-processing to extract an environment-independent autocorrelation function (ACF) feature matrix. In the second stage 220, the extracted ACF matrices are fed into a disclosed neural network, which is trained to perform three-class classification: empty, child, and adult. In the final stage 230, post-processing is applied to enhance the classification stability by performing temporal smoothing through window-based fusion over the observation period to generate the final results 240.

During the pre-processing stage 210, motion and respiratory patterns provide the most intuitive and discriminative features for distinguishing child-only presence from other scenarios, such as empty or adult cases. Generally, children's movements are faster and more abrupt than those of adults, and are associated with smaller body sizes. In addition, when subjects are relatively static, children's breathing rates are typically higher (approximately 20-30 breaths per minute) compared to adults. Therefore, motion and breathing features extracted from WiFi CSI offer strong cues for differentiating among the three classes: empty, child, and adult. However, relying solely on extracted motion statistics and breathing rates may discard other valuable information necessary for robust classification. In addition, noise in the ACF, introduced by environmental factors, can lead to inaccurate estimations. To address these challenges, the full ACF is used as the input feature to the network. The ACF inherently captures information related to both motion and respiratory dynamics. While weighted averaging of ACFs across subcarriers can enhance the signal-to-noise ratio (SNR) and improve the accuracy of motion and breathing rate estimation, such aggregation may eliminate important spatial information critical for distinguishing between children and adults.

In some embodiments, since each subcarrier captures reflections from distinct propagation paths and objects, their individual ACF responses contain rich spatial information that can be leveraged for improved child-adult classification. To preserve this diversity, the system can compute the ACF independently for each subcarrier. These ACFs are then stacked to form a two-dimensional matrix of size $l \times N_s$, where $N_s$ is the total number of subcarriers across all WiFi links, and l is the number of time lags considered when calculating the ACF. The resulting $l \times N_s$ matrix serves as the input to the deep learning model.

The neural network stage 220 may include two key stages. First, a transformer-based encoder is used to extract spatiotemporal representations from the input data. One can adopt an auto-former encoder originally designed for time series forecasting, leveraging its inherent decomposition mechanism and ability to model long-range dependencies. Second, an MLP network maps these representations to the final output, enhancing the extraction of discriminative features for classification.

The order of ACF lags contains useful information about signal periodicity and motion patterns, while the order of subcarriers reflects spatial-domain features, such as proximity to the antenna location. Therefore, positional encoding plays a crucial role in preserving these hierarchical structures. Without it, the encoder would treat ACF lags and subcarriers as unordered features, especially when the input sequence is divided into patches along the time (lag) and subcarrier dimensions. To address this, one can apply sinusoidal positional encoding across both dimensions, ensuring that each (lag, subcarrier) pair is uniquely encoded to maintain the structural relationships within the data.

The auto-former based encoder may include three main components: an auto-correlation-based attention block, a series decomposition block, and a feedforward network.

The auto-correlation-based attention block replaces the conventional self-attention mechanism used in standard transformer encoders, offering both higher efficiency and improved accuracy for time series analysis. This mechanism is particularly effective at extracting periodic patterns related to breathing and motion trends by modeling both subcarrier-local effects and cross-subcarrier dependencies.

One can assume an ACF of length l extracted from $N_s$ subcarriers. In this case, the input X to the encoder layer has the shape $l \times N_s$. One can first project the input X into the query Q, key K, and value V spaces using learnable linear transformations. The system can use three separate linear layers to map the input as:

$$Q = X \cdot W_Q,\ K = X \cdot W_K,\ V = X \cdot W_V,$$

where $W_Q$, $W_K$, and $W_V$ are learnable weight matrices.

For the single-head case, the attention mechanism can be expressed as follows. First, one can compute the cross-correlation between Q and K efficiently using FFT operations:

$$R_{(Q,K)}(\tau) = IFFT(FFT(Q) \cdot FFT(K)^*),$$

where $(\cdot)^*$ denotes the complex conjugate of the signal. However, since the disclosed input ACF is a real-valued time series, the conjugate simplifies to taking the squared magnitude of the FFT components.

The resulting cross-correlation scores are used to aggregate the input. For each subcarrier, the system can select the k most correlated lags, $\tau_1, \ldots, \tau_k$ and circularly shift (Roll) the sequence V by these lags to aggregate the output as below:

$$S_{Q,K}(\tau_1), \ldots, S_{Q,K}(\tau_k) = SoftMax(R_{Q,K}(\tau_1), \ldots, R_{Q,K}(\tau_k))\text{Attention}(Q, K, V) = \sum_{\tau_i \in top-k} S_{Q,K}(\tau_i) \cdot \text{Roll}(V, \tau_i).$$

where $R_{Q,K}(\tau_i)$ is the autocorrelation of lag $\tau_i$ between series Q and K, Roll(V, $\tau_i$) represents the operation of circular shift with time delay $\tau_i$ and top–k is the subset of time lags with top k correlations. Here, the system may directly aggregate the input based on the most correlated lags, preserving the temporal structure of the sequence.

In the multi-head version, the model may operate along the subcarrier dimension while preserving both subcarrier relationships and temporal periodicity. Each head i has its own learnable projection matrices, with the query, key, and value dimensions given by $$Q^i, K^i, V^i \in R^{l \times \frac{N_s}{h}},$$

where $i \in 1, \ldots, h$ and h is the number of heads. The multi-head attention output is computed by concatenating the outputs of each head and applying a final linear transformation as, $$Multi-\text{Head Attention} = W_{out} \cdot Concat(head_1, \ldots, (head_h) \text{ where } head_i = \text{Attention}(Q^i, K^i, V^i).$$

The series decomposition block in the encoder can separate the input into trend and seasonal components. This enhances feature quality by isolating periodic patterns from static or slowly varying noise. The seasonal components are analyzed in deeper layers, enabling the model to focus more effectively on finer periodic trends.

The spatiotemporal features extracted by the initial blocks are further processed within the feedforward block of the encoder, to integrate information across subcarriers. This block comprises two 1D convolutional layers, each followed by a Gaussian Error Linear Unit (GELU) activation function to introduce nonlinearity.

An MLP network in the neural network stage 220 can further process the encoded feature vector to produce the final classification output. The MLP may comprise three fully connected layers, each followed by a ReLU activation function. These layers progressively compress the feature map into a low-dimensional representation mapped to three output values corresponding to the classes: Empty, Adult, and Child.

To mitigate sudden misdetections and false alarms caused by fluctuations between classes, the system can apply temporal smoothing, which leverages past predictions to reduce spurious spikes. These fluctuations often arise from noise interference in some data samples, leading the model to make abrupt and incorrect class transitions. As a post-processing step, the system can apply a moving average filter to the class probabilities using a sliding window. Although this method introduces a small amount of latency proportional to the window size, it offers a favorable trade-off by significantly improving prediction stability and overall system reliability.

Figure 3:
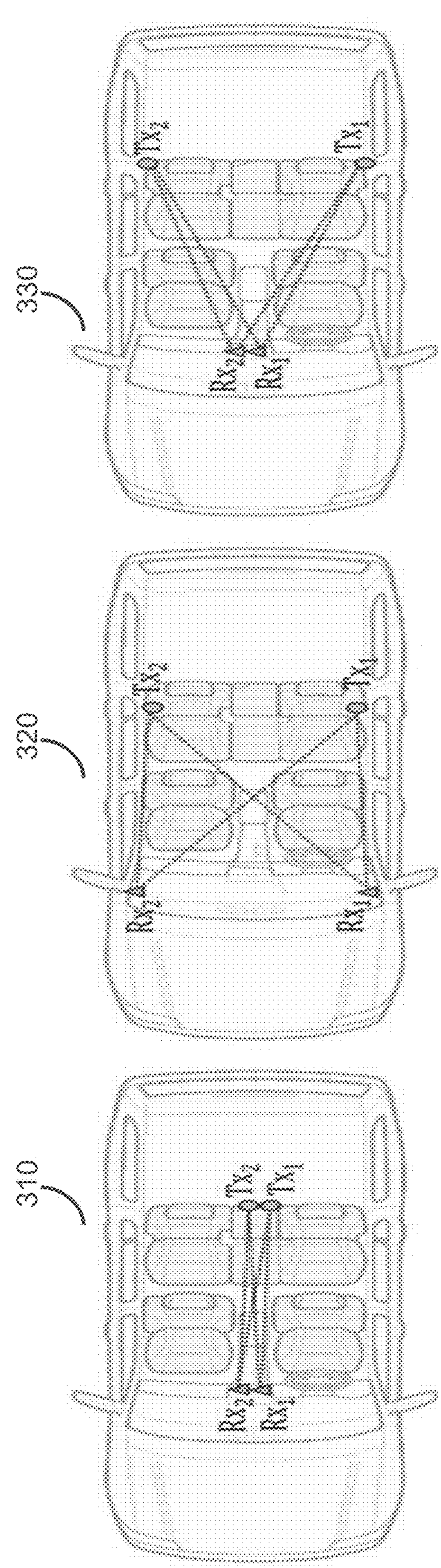
FIG. 3 illustrates example antenna configurations for child presence detection, according to some embodiments of the present disclosure.

FIG. 3 illustrates example antenna configurations for child presence detection, according to some embodiments of the present disclosure. In a co-located setup 310, both the transmit (Tx) and receive (Rx) antennas are co-located. The Rx can be placed in the front, and the Tx can be placed in the back, or vice versa. In a distributed setup 320, the two Tx and two Rx antennas are placed in the four corners of the car, where the Rx antennas are placed in the two corners of the front dashboard and Tx antennas are near the two sides of the back seats. In a hybrid setup 330, the Rx antennas are placed in a co-located manner, and the Tx antennas are placed in a distributed way. The position of Tx and Rx antennas can be interchanged.

In some embodiments, the deep learning network in the DeepCPD has a two-stage training. The amount of data from children is often limited. While one can simulate children's breathing behavior using a baby doll, real child motion data is scarce, and adult data is also somewhat limited. To address the challenge of limited in-car data, the system can adopt a two-stage training procedure designed to maximize the model's ability to distinguish subtle motion patterns.

In Stage 1, one can train the model using labeled data collected from indoor environments, such as houses and apartments, labeled as presence or non-presence, along with in-car data labeled as presence or empty. All adult and child data are grouped into a single class labeled as presence. This training focuses on learning basic motion and breathing features. To maintain consistency with in-vehicle conditions, the system can exclude walking data from the indoor datasets, as gait patterns are not typically observed inside vehicles. During this stage, the MLP network is adapted for binary classification (empty vs. presence) and trained using binary cross-entropy (BCE) loss with the Adam optimizer.

In Stage 2, the system can fine-tune the pre-trained encoder using a modified MLP head designed for a three-class classification task. The system can initially freeze the encoder layers and train only the modified MLP head. The system can then gradually unfreeze the encoder and employ discriminative learning rates. The pre-trained encoder employs a lower learning rate ($1\times10^{-5}$) to prevent catastrophic forgetting, while the MLP head utilizes a higher learning rate ($1\times10^{-3}$) to adapt efficiently to the three-class classification task. A step decay learning rate schedule is applied to ensure stable convergence. Additionally, the system can use a smaller batch size (32) in Stage 2 compared to Stage 1 to improve generalization. The system can employ cross-entropy loss with the Adam optimizer to jointly fine-tune the encoder and train the new MLP head. The updated MLP head outputs three probabilities corresponding to the classes: Empty, Adult, and Child. Through this fine-tuning process, the encoder learns to distinguish child-specific features from adult features more effectively.

To train a generalized neural network, a balanced and sufficiently large dataset is essential. While the two-stage training approach partially addresses the challenges of limited data, the system may still require a substantial amount of data for each scenario to fine-tune the model effectively. Traditional data augmentation techniques commonly used in computer vision, such as rotation, shifting, and scaling, are not applicable here, as preserving temporal information is critical. To overcome this, the system can utilize two data augmentation techniques specifically designed based on the analysis of data patterns.

Figure 4:
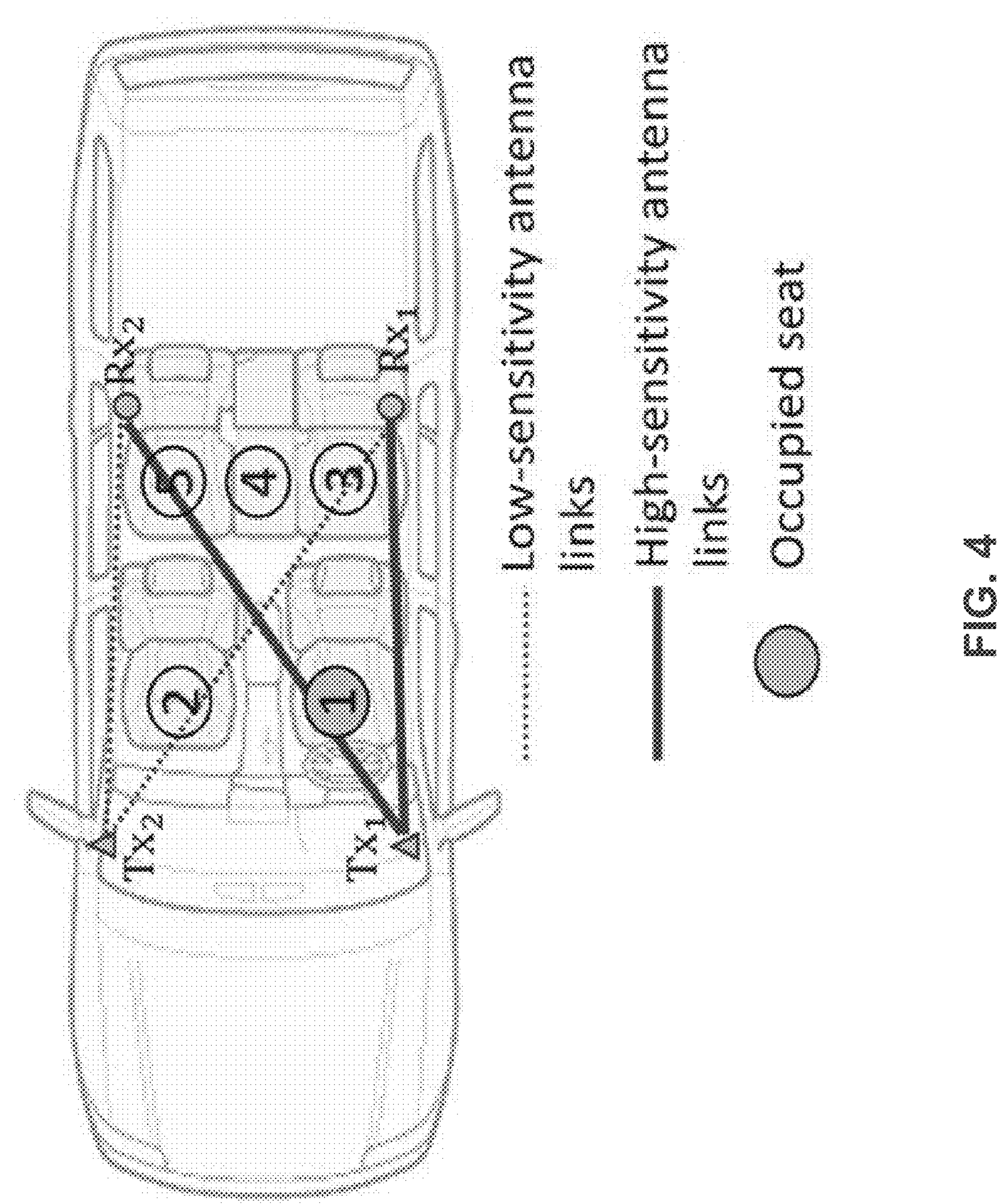
FIG. 4 illustrates an example antenna configuration and data collection setup, according to some embodiments of the present disclosure.

Here, one can analyze the ACF generated from a distributed antenna setup when the user occupies the driver's seat. With two transmit (Tx) and two receive (Rx) antennas, the system forms four distinct links, each producing a unique ACF. FIG. 4 shows antenna configuration and data collection setup to determine the ACF extracted from the most sensitive subcarrier by selecting the subcarrier with the highest motion statistics, for each link during a breathing scenario when the user is seated in seat 1. The links between Tx1-Rx1 and Tx1-Rx2 exhibit clear periodic patterns, as the user is positioned close to the Tx1 antenna.

Building on the observation that links involving the nearest antennas exhibit higher sensitivity, the system can leverage multi-antenna diversity (in this case, a 2×2 configuration with 2 Tx and 2 Rx antennas) to generate multiple versions of the data. By permuting the autocorrelation functions (ACFs) computed from each transmit-receive antenna pair, the system can create synthetic samples that simulate variations in user position. This approach effectively augments the dataset, mimicking how signals might behave if the user were sitting in a different position, even though the physical location is not changing. This approach helps prevent overfitting to a specific seat location and promotes generalization to unseen antenna configurations (i.e., the same setup with a different antenna ordering).

Inspired by the mix-up data augmentation technique, the system can utilize a method that combines samples representing the same activity (child motion) but captured in different environments, positions, or with different Tx-Rx configurations. Specifically, the system can create a synthetic data sample by merging links from two different samples: high-sensitivity links are taken from one sample, and low-sensitivity links from the other. Sensitivity is measured using the motion statistics feature.

Unlike conventional mix-up, where samples from different classes are blended, the system may only mix data within the same class. This approach generates new, diverse representations of the same activity, improving the network's ability to generalize to unseen locations (e.g., different car models) and device setups, thereby enhancing domain adaptation.

The performance of the DeepCPD system can be evaluated based on various evaluation metrics. The first metric is detection rate, or true positive rate (TPR), which measures the probability of correctly detecting the child's presence. The second metric is false alarm or false positive rate (FPR), which represents the probability of misidentifying an empty car as a child presence. The third metric is accuracy, which quantifies the overall correctness of the models' predictions, defined as the ratio of the number of correctly classified data points to the total number of input data. The fourth metric is F1 score which measures the balance between precision and recall, and is calculated as the harmonic mean of these two metrics as $$F1 = 2\cdot\frac{\text{precision}\cdot\text{recall}}{\text{precision}+\text{recall}'}$$

where recall quantifies the likelihood of the system correctly identifying the target, and precision represents the ratio of true positive predictions to the total number of positive predictions made.

Figure 5:
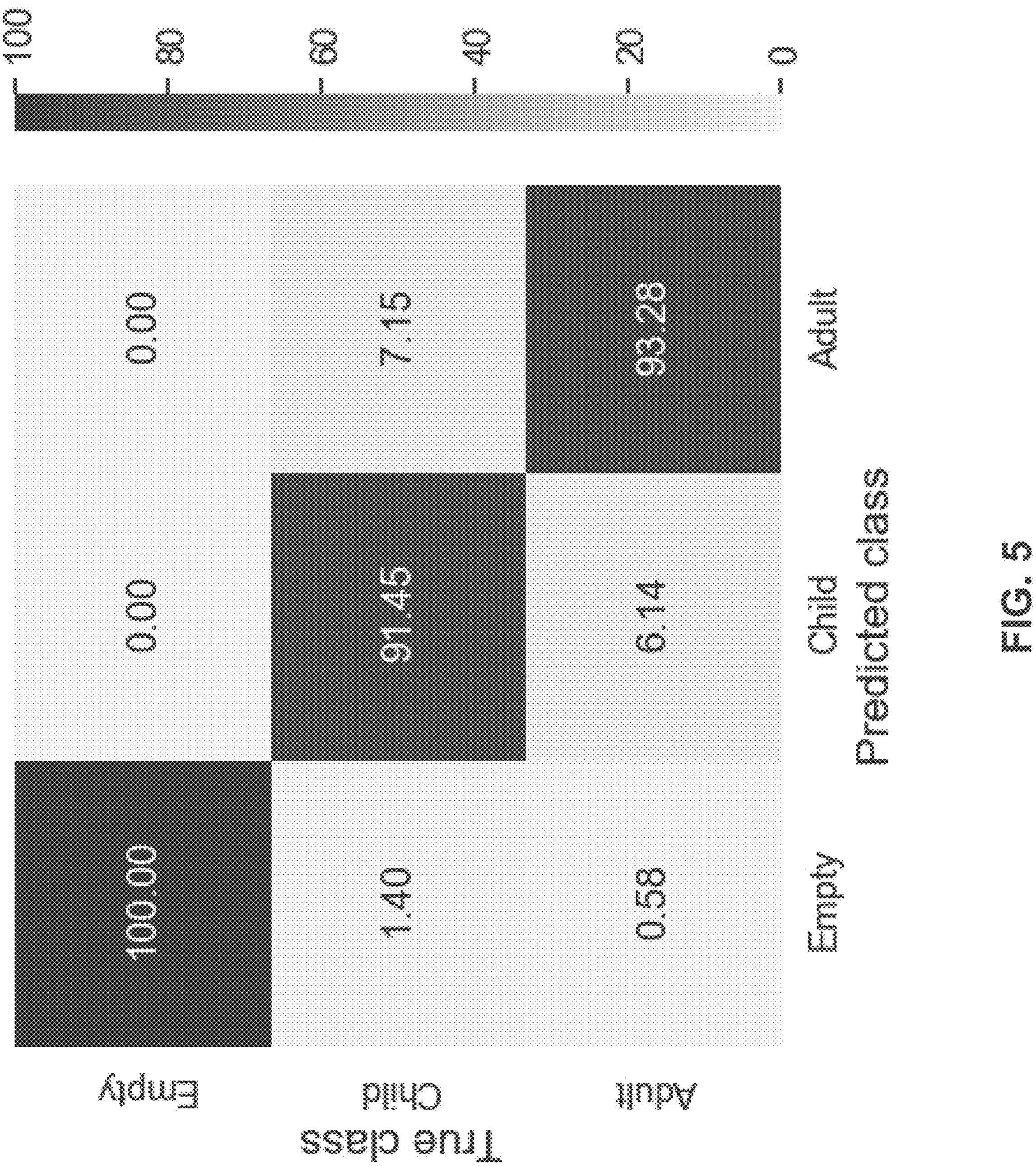
FIG. 5 illustrates an example confusion matrix for child, adult, and empty classification, according to some embodiments of the present disclosure.

In some embodiments, the overall test confusion matrix 500, illustrating the detection performance for each class, is shown in FIG. 5. As observed, the child detection accuracy is comparatively lower, due to older children's motion patterns resembling those of adults, leading to misclassification.

Figure 6:
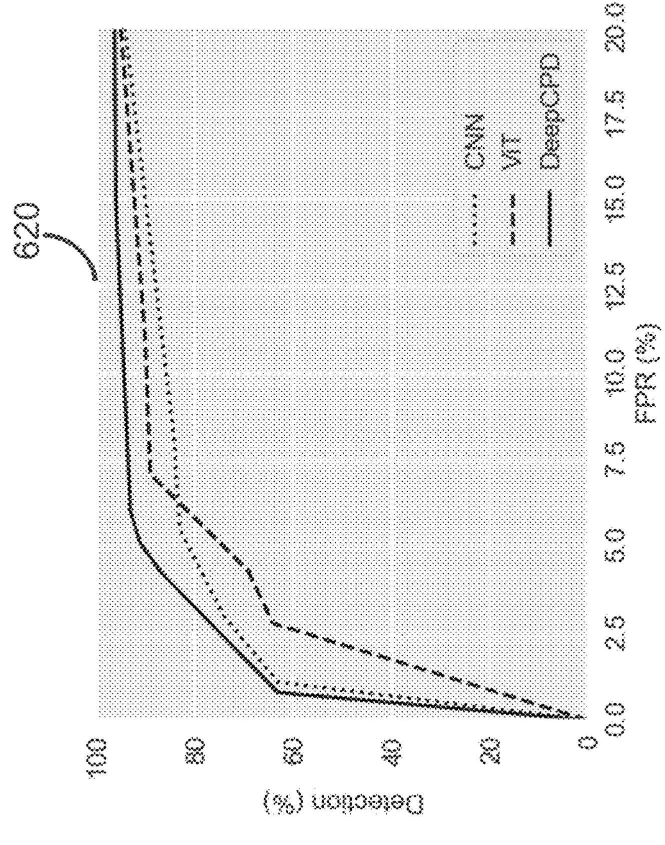
FIG. 6 illustrates example ROC curves generated from different baseline network architectures, according to some embodiments of the present disclosure.
Figure 6:
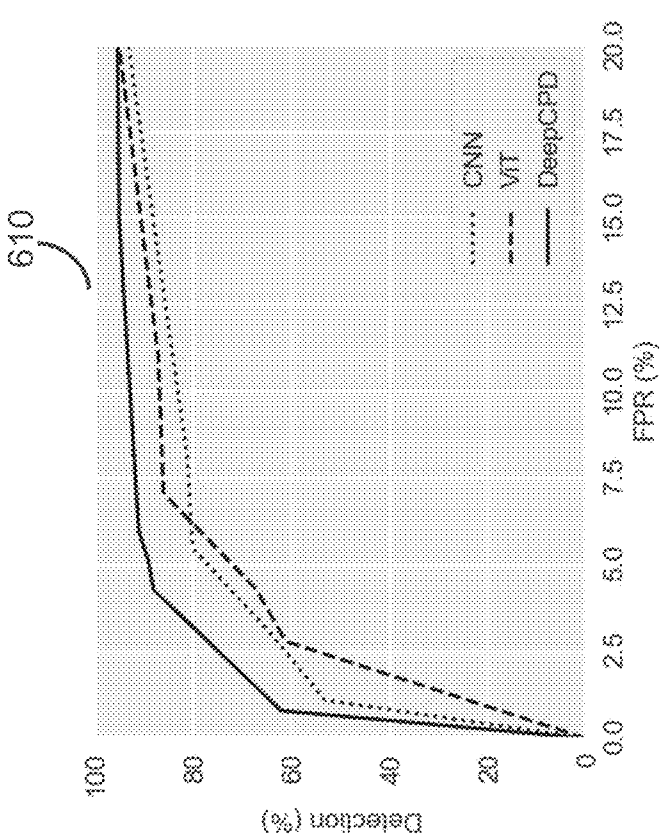

Comparing the validation and testing accuracy of DeepCPD against baseline models can demonstrate that the disclosed method consistently outperforms all baselines. FIG. 6 shows a comparison of the ROC curves for the child class using DeepCPD and two baseline models, CNN and ViT. The ROC curve 610 is generated for unseen user in unseen environment, while the ROC curve 620 is generated for seen user in unseen environment. As shown in FIG. 6, DeepCPD outperforms the baselines in both seen and unseen user scenarios. Furthermore, its performance remains consistent even with unseen subjects, demonstrating generalization capability across user variations. One can also evaluate impacts of child status, child's age, different antenna setups, coverage, input type (raw CSI, averaged ACF, or full subcarrier-wise ACF), series decomposition block, two-stage training, to the system.

In some embodiments, the system can use two data augmentation strategies that leverage antenna diversity and the data patterns observed in the separated antenna setup to enhance the network's generalization in unseen environments. Since sleeping children can already be detected with high accuracy without augmentation, one can focus on evaluating the effectiveness of these strategies in the more challenging awake scenario. For example, the link-mix augmentation method can notably improve differentiation between children and adults in the awake state.

In some embodiments, the system's real-time performance delay depends on the window size and the stride used in the sliding window. The maximum delay introduced by the sliding window is equal to the window size, while the average delay is slightly larger than half of the window size.

As discussed above, the present disclosure discloses a novel deep learning framework that leverages an environment-independent ACF representation to capture spatial-temporal patterns for distinguishing child-only presence from adult and empty-seat scenarios. The system can accurately detect a child's presence inside a car regardless of their state (sleeping or awake) and distinguish child presence from adults. The system utilizes an environment-independent feature ACF instead of using raw CSI. The two synthetic data generation techniques, link permutation and link mix, are specifically designed to mimic real-world variations relevant to the task. The system employs a two-stage training procedure to address in-car data scarcity, utilizing WiFi data collected in residential environments and validating the transferability of a pre-trained encoder across different domains.

In some embodiments, the model is applied to single-child occupant scenarios and multi-occupant scenarios only when a child is present with an adult. Due to the requirement of detecting a left-alone child, one can classify child-and-adult presence scenarios as the adult class.

In some embodiments, the network can be easily extended to handle scenarios of multiple children's occupancy or child-pet coexistence, provided that the training data capturing the scenario is available. Since the system can use ACFs extracted from all subcarriers as the network input, the ACFs inherently capture motion and breathing patterns. These patterns can be leveraged to detect multi-child occupancy and to extract distinctive features associated with pets, enabling the system to differentiate between child and pet presence.

Environmental factors inside and outside the car can affect the system's performance. Specifically, when a child is not moving much, subtle motion associated with breathing can be easily corrupted by some severe conditions. In addition, periodic environmental patterns can be mistaken for breathing-like signals, leading to false alarms. To ensure robustness, the system is trained on data collected under challenging conditions such as rain, strong winds, busy parking lots, and in-vehicle systems like air conditioning and music. The environmental factors only have a marginal impact on the system's performance, demonstrating the effectiveness of the disclosed system design for real-world scenarios.

In some examples, DeepCPD uses the ACF generated from all subcarriers as input to achieve the best performance. In some examples, instead of considering all the subcarriers, one can use a separate subcarrier selection mechanism before the neural network design. The system can select a fixed number of subcarriers based on various criteria such as: motion statistic-based selection (utilizing the motion statistic feature and selecting the top-k subcarriers with maximum motion stats), selecting less noisy subcarriers, learning-based subcarrier selection. One can utilize an MLP or CNN-based subcarrier selection block in the beginning and allow the network to learn highly sensitive subcarriers before extracting features. In some examples, a similar operation is performed inside the network. Using initial subcarrier selection can reduce the network complexity and allow the network to handle varying subcarrier lengths.

In some examples, DeepCPD uses two data augmentation techniques, namely link-permutation and link-mix. In link-mix, one combine links between two data samples within one class. The system can generalize the link-mix data augmentation as follows. First, the system performs link mix between two data samples by combining links between two classes. However, in contrast to link mix within the class, one can assign a new label to the data based on how the links are combined. For instance, the generated data after combining 2 links from class A with 2 links from class B will be labeled as (label A+label B)/2. Then the system can perform weighted link mix, by combining links as:

$$\text{generated input} = w1 * (\text{links form class } A) + w2 * (\text{links from class } B) \text{ where } w1 + w2 = 1,$$

$$\text{new label for generated data} = w1 * \text{label } A + w2 * \text{label } B.$$

In some embodiments, DeepCPD uses a two-stage training to handle limited child and adult data in-cars. Instead of two-stage training, one can also employ a self-supervised training mechanism to train the encoder. For example, the system can use contrastive training to train the encoder only with residential and in-car data. The system can use an encoder-decoder architecture and learn to predict the masked input using all the data. Then, the system can use the trained encoder above for the task. The system can also perform a cluster-based training by training the encoder to group data into clusters in an unsupervised manner, possibly to three clusters: motion, breathing, and empty.

Figure 7:
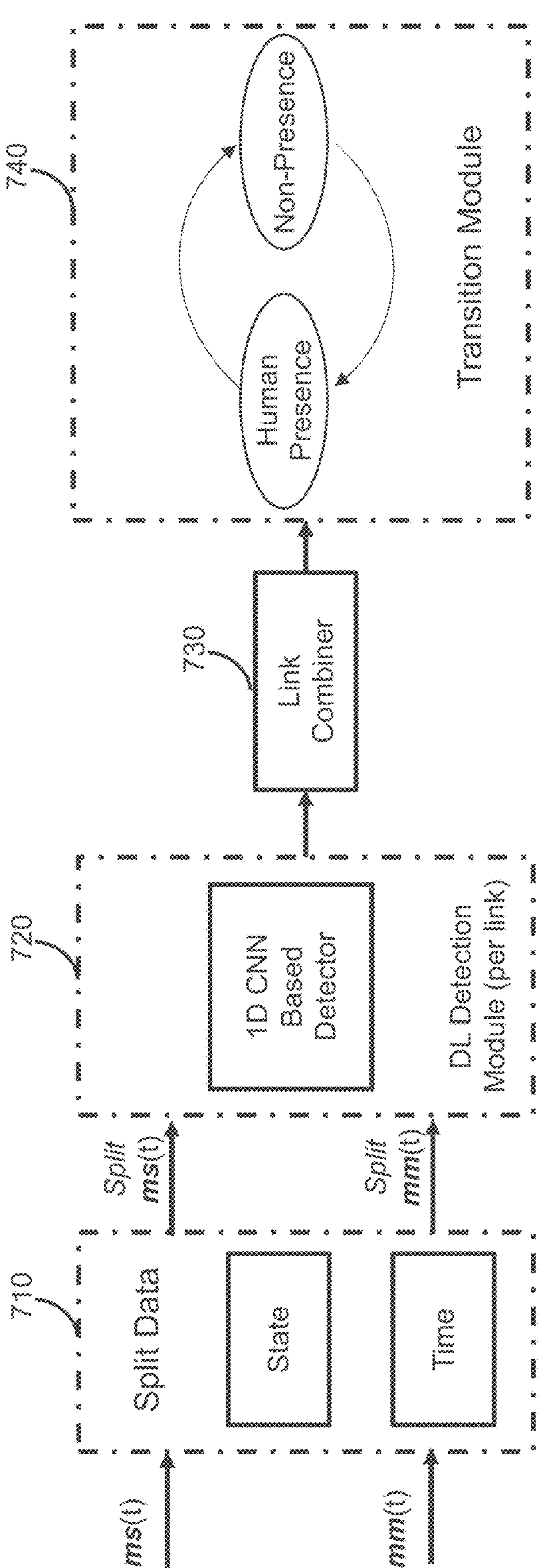
FIG. 7 illustrates an example system for occupancy detection based on deep learning, according to some embodiments of the present disclosure.

FIG. 7 illustrates an example system 700 for occupancy detection based on deep learning, according to some embodiments of the present disclosure. As shown in FIG. 7, the system 700 includes a split data module 710, a deep learning detection module 720, a link combiner 730, and a transition module 740.

In some embodiments, the split data module 710 receives motion statistics data ms(t) and micromotion data mm(t) extracted for a time period, e.g. 24 hours, and splits the data according to state and time. For example, for each fixed time (24 H, Day, night) and each state (inside, outside), the split data module 710 splits data to a total of 6 sets of mm/ms.

The deep learning detection module 720 may receive the split ms(t) and split mm(t), executes a deep learning model using these data, e.g. a ID CNN based detector, on each link independently. The deep learning detection module 720 can generate occupancy detection results for each link.

The link combiner 730 may combine the detection results per link from the deep learning detection module 720. In some examples, the combination is based on pick-max or logical OR. For example, so long as one link detects an occupancy, the venue is determined to be occupied. The venue is determined to be empty only if none of the links detects an occupancy. Other combination methods (e.g. majority rule, X % threshold, etc.) can be used without going beyond the scope of the disclosure. The link combiner 730 can output a combined detection result to the transition module 740. The transition module 740 can generate and record transition states of the venue over time from human presence to non-presence, or vice versa, based on the combined detection result from the link combiner 730.

Figure 8:
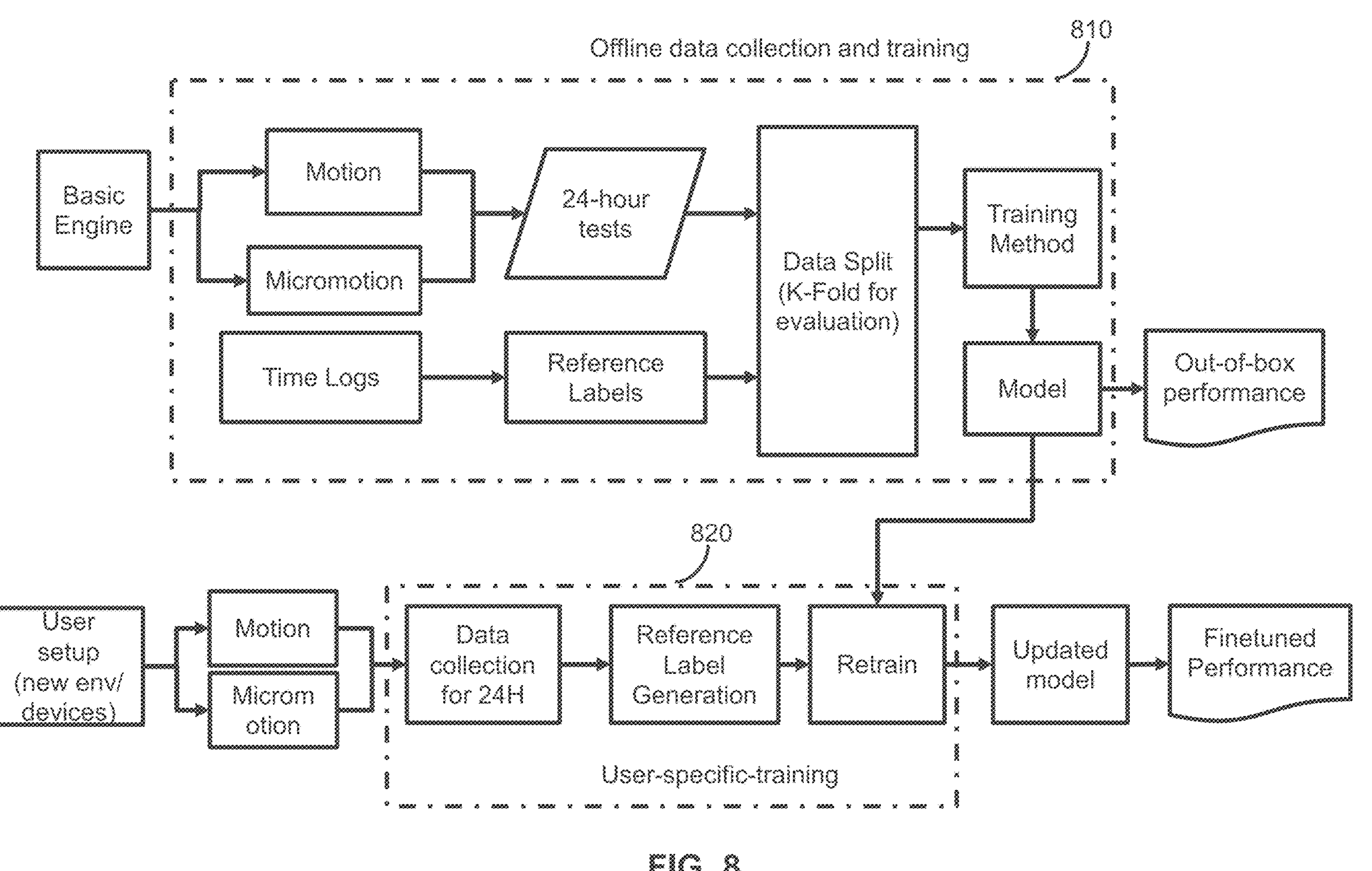
FIG. 8 illustrates an example process for training and re-training a deep learning model, according to some embodiments of the present disclosure.

FIG. 8 illustrates an example process 800 for training and re-training a deep learning model, according to some embodiments of the present disclosure. In some embodiments, the deep learning model may be a neural network used in the deep learning detection module 720 of FIG. 7. As shown in FIG. 8, the process 800 includes two stages, an offline data collection and training stage 810 and a user-specific training stage 820.

In some examples, during the offline data collection and training stage 810, the motion data and micromotion data generated by a basic engine can be collected for 24 hours and split with reference labels and time logs to generate a first training dataset. The deep learning model may be trained based on the first training dataset offline. In the example of FIG. 7, different deep learning models may be trained offline for different links based on different training datasets. After the offline data collection and training stage 810, each trained deep learning model may be stored before real-time CSI is obtained for occupancy detection.

In some examples, the user-specific training stage 820 may be performed after a user setup, based on motion data and micromotion data collected after the user setup. The user setup may include: a new environment of the venue, adding or removing a transmitter in the venue, adding or removing a receiver in the venue, or a setup change to any transmitter or any receiver. For example, after collecting (and splitting) data for 24 hours, an automatic annotation method is performed in the user-specific training stage 820 for user-specific reference label generation.

In some embodiments, the data captured may be sent to a cloud server, and the automatic annotation is performed on the cloud server. A local device can receive data from the cloud server afterwards. The outputs of the automatic annotation method may include a time window (e.g. one hour) of highly confident "motion/occupied" data, and a time window (e.g. one hour) of highly confident "empty." data. In some examples, the automatic annotation method can find one hour in a day with highest and lowest motion statistics on average, and label them with occupied and empty, respectively.

In some embodiments, the automatic annotation method may be performed locally on a local device. In some examples, the local device captures and stores all 24 hours of motion data and micromotion data, applies the automatic annotation method by looking at the stored data, and extracts the motion and micromotion data from the last 24 hours.

In some embodiments, the local device runs a real-time automatic annotation method. The local device can continuously keep the most confident 1-hour empty and motion data at an offline database. When a new 1-hour data is captured, it is stored and compared to the one on the offline database. If the new 1-hour data is more confident, the local device replaces the previously stored data with the new 1-hour data in the offline database.

In some embodiments, user feedback may be utilized for the automatic annotation method. If the user labels something as false positive, the device can label the previous/after K (e.g. 5-10) minutes with empty state. If the user labels it as false negative, the device can label previous/after K minutes with occupied state.

After the automatic annotation method, the annotated data is sent to the re-train module in the user-specific training stage 820 for re-training the deep learning model. During the re-training, the new annotated data is used to re-train model parameters of the deep learning model. In some embodiments, the cloud server can perform the re-training, extract new model parameters, and push to the local device to update the deep learning model.

In some embodiments, the re-training procedure may be performed locally on the device. In some examples, the local device updates the model parameters on the local device, without need to push to the cloud.

In some examples, the re-training module may be replaced by one-shot learning or on-line learning on the local device, instead of training the model entirely from scratch. In some examples, some layer, e.g. first N layers, can be frozen during the re-training.

In some embodiments, the local device would push all the data to cloud. The cloud will run the model on the cloud, and send the detection results back to the user when needed. As such, all training and re-training can be done on the cloud, with user feedback incorporated as well.

Figure 9:
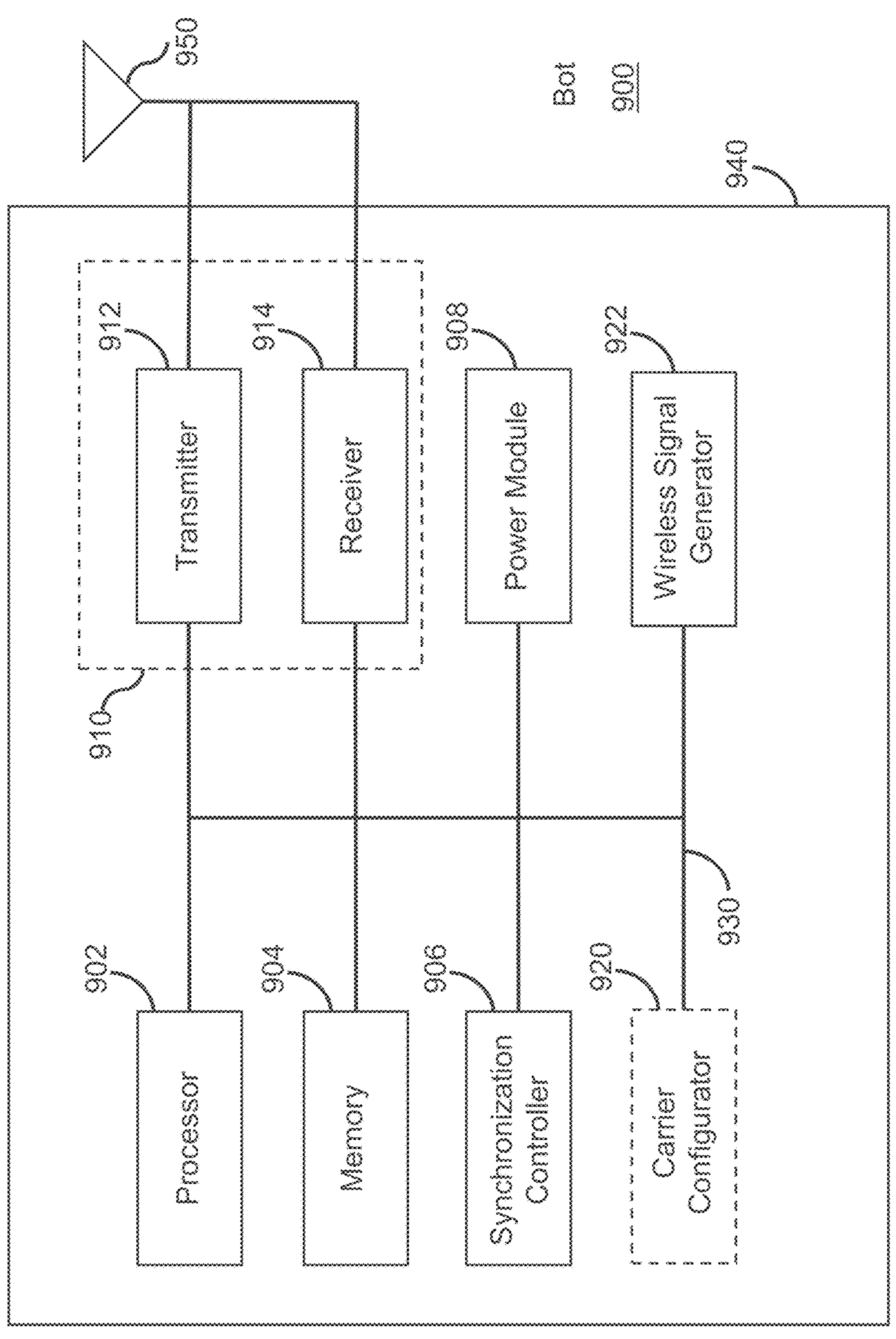
FIG. 9 illustrates an example block diagram of a first wireless device of a system for wireless based occupancy detection, according to some embodiments of the present disclosure.

FIG. 9 illustrates an example block diagram of a first wireless device, e.g. a Bot 900, of a system for wireless based occupancy detection, according to one embodiment of the present teaching. The Bot 900 is an example of a device that can be configured to implement the various methods described herein. As shown in FIG. 9, the Bot 900 includes a housing 940 containing a processor 902, a memory 904, a transceiver 910 comprising a transmitter 912 and receiver 914, a synchronization controller 906, a power module 908, an optional carrier configurator 920 and a wireless signal generator 922.

In this embodiment, the processor 902 controls the general operation of the Bot 900 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 904, which can include both read-only memory (ROM) and random access memory (RAM), can provide instructions and data to the processor 902. A portion of the memory 904 can also include non-volatile random access memory (NVRAM). The processor 902 typically performs logical and arithmetic operations based on program instructions stored within the memory 904. The instructions (a.k.a., software) stored in the memory 904 can be executed by the processor 902 to perform the methods described herein. The processor 902 and the memory 904 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 910, which includes the transmitter 912 and receiver 914, allows the Bot 900 to transmit and receive data to and from a remote device (e.g., an Origin or another Bot). An antenna 950 is typically attached to the housing 940 and electrically coupled to the transceiver 910. In various embodiments, the Bot 900 includes (not shown) multiple transmitters, multiple receivers, and multiple transceivers. In one embodiment, the antenna 950 is replaced with a multi-antenna array 950 that can form a plurality of beams each of which points in a distinct direction. The transmitter 912 can be configured to wirelessly transmit signals having different types or functions, such signals being generated by the processor 902. Similarly, the receiver 914 is configured to receive wireless signals having different types or functions, and the processor 902 is configured to process signals of a plurality of different types.

The Bot 900 in this example may serve as a Bot 102 in FIG. 1 for performing one or more wireless sensing tasks. For example, the wireless signal generator 922 may generate and transmit, via the transmitter 912, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 922 may be based on a request for motion detection from another device, e.g. an Origin, or based on a system pre-configuration. That is, the Bot 900 may or may not know that the wireless signal transmitted will be used to detect motion.

The synchronization controller 906 in this example may be configured to control the operations of the Bot 900 to be synchronized or un-synchronized with another device, e.g. an Origin or another Bot. In one embodiment, the synchronization controller 906 may control the Bot 900 to be synchronized with an Origin that receives the wireless signal transmitted by the Bot 900. In another embodiment, the synchronization controller 906 may control the Bot 900 to transmit the wireless signal asynchronously with other Bots. In another embodiment, each of the Bot 900 and other Bots may transmit the wireless signals individually and asynchronously.

The carrier configurator 920 is an optional component in Bot 900 to configure transmission resources, e.g. time and carrier, for transmitting the wireless signal generated by the wireless signal generator 922. In one embodiment, each CI of the time series of CI has one or more components each corresponding to a carrier or sub-carrier of the transmission of the wireless signal. The detection of the motion may be based on motion detections on any one or any combination of the components.

The power module 908 can include a power source such as one or more batteries, and a power regulator, to provide regulated power to each of the above-described modules in FIG. 9. In some embodiments, if the Bot 900 is coupled to a dedicated external power source (e.g., a wall electrical outlet), the power module 908 can include a transformer and a power regulator.

The various modules discussed above are coupled together by a bus system 930. The bus system 930 can include a data bus and, for example, a power bus, a control signal bus, and/or a status signal bus in addition to the data bus. It is understood that the modules of the Bot 900 can be operatively coupled to one another using any suitable techniques and mediums.

Although a number of separate modules or components are illustrated in FIG. 9, persons of ordinary skill in the art will understand that one or more of the modules can be combined or commonly implemented. For example, the processor 902 can implement not only the functionality described above with respect to the processor 902, but also implement the functionality described above with respect to the wireless signal generator 922. Conversely, each of the modules illustrated in FIG. 9 can be implemented using a plurality of separate components or elements.

Figure 10:
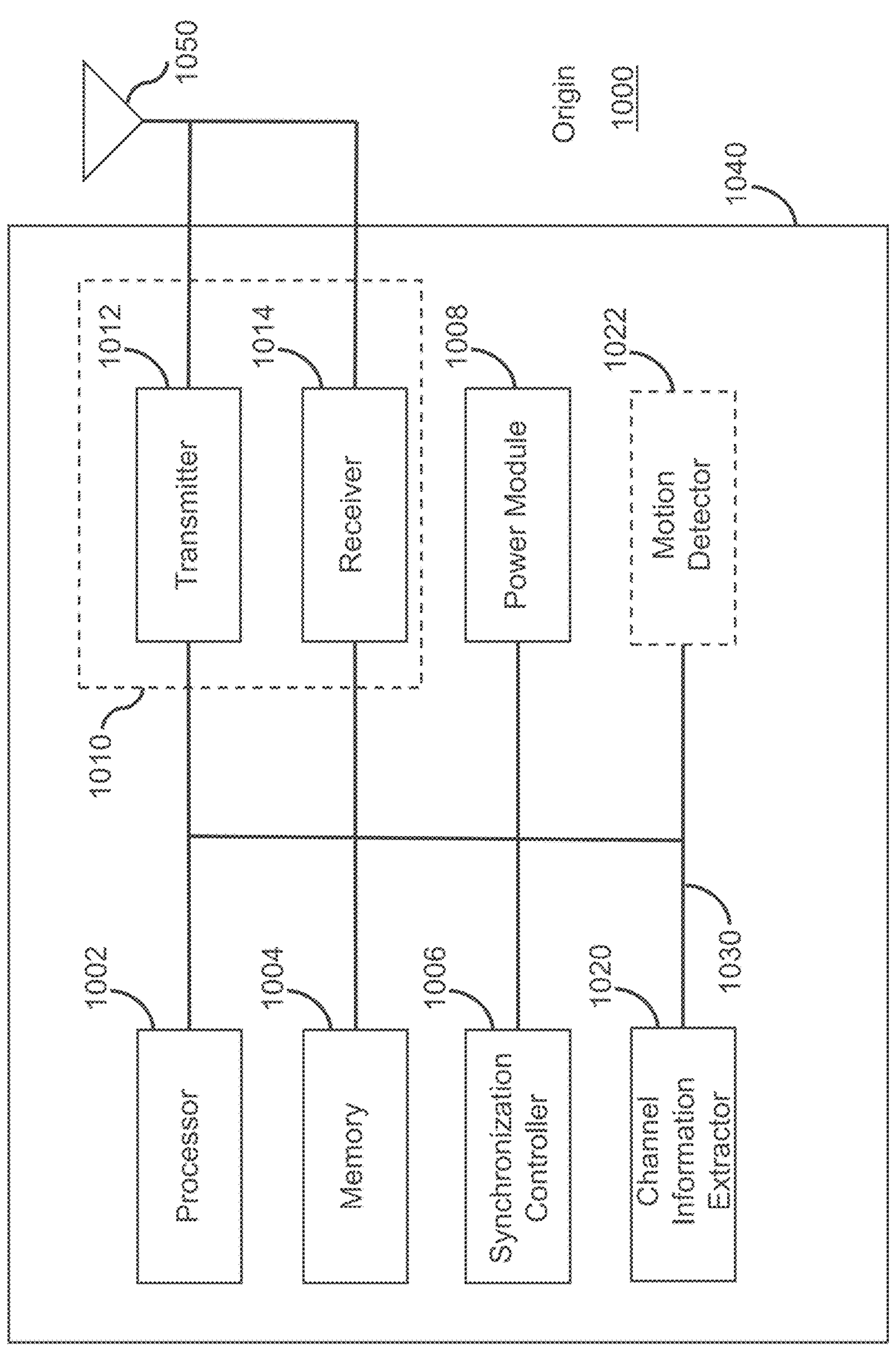
FIG. 10 illustrates an example block diagram of a second wireless device of a system for wireless based occupancy detection, according to some embodiments of the present disclosure.

FIG. 10 illustrates an example block diagram of a second wireless device, e.g. an Origin 1000, of a system for wireless based occupancy detection, according to one embodiment of the present teaching. The Origin 1000 is an example of a device that can be configured to implement the various methods described herein. The Origin 1000 in this example may serve as an Origin 104 in FIG. 1 for performing one or more wireless sensing tasks. As shown in FIG. 10, the Origin 1000 includes a housing 1040 containing a processor 1002, a memory 1004, a transceiver 1010 comprising a transmitter 1012 and a receiver 1014, a power module 1008, a synchronization controller 1006, a channel information extractor 1020, and an optional motion detector 1022.

In this embodiment, the processor 1002, the memory 1004, the transceiver 1010 and the power module 1008 work similarly to the processor 902, the memory 904, the transceiver 910 and the power module 908 in the Bot 900. An antenna 1050 or a multi-antenna array 1050 is typically attached to the housing 1040 and electrically coupled to the transceiver 1010.

The Origin 1000 may be a second wireless device that has a different type from that of the first wireless device (e.g. the Bot 900). In particular, the channel information extractor 1020 in the Origin 1000 is configured for receiving the wireless signal through the wireless multipath channel impacted by the motion of the object in the venue, and obtaining a time series of channel information (CI) of the wireless multipath channel based on the wireless signal. The channel information extractor 1020 may send the extracted CI to the optional motion detector 1022 or to a motion detector outside the Origin 1000 for detecting object motion in the venue.

The motion detector 1022 is an optional component in the Origin 1000. In one embodiment, it is within the Origin 1000 as shown in FIG. 10. In another embodiment, it is outside the Origin 1000 and in another device, which may be a Bot, another Origin, a cloud server, a fog server, a local server, and an edge server. The optional motion detector 1022 may be configured for detecting the motion of the object in the venue based on motion information related to the motion of the object. The motion information associated with the first and second wireless devices is computed based on the time series of CI by the motion detector 1022 or another motion detector outside the Origin 1000.

The synchronization controller 1006 in this example may be configured to control the operations of the Origin 1000 to be synchronized or un-synchronized with another device, e.g. a Bot, another Origin, or an independent motion detector. In one embodiment, the synchronization controller 1006 may control the Origin 1000 to be synchronized with a Bot that transmits a wireless signal. In another embodiment, the synchronization controller 1006 may control the Origin 1000 to receive the wireless signal asynchronously with other Origins. In another embodiment, each of the Origin 1000 and other Origins may receive the wireless signals individually and asynchronously. In one embodiment, the optional motion detector 1022 or a motion detector outside the Origin 1000 is configured for asynchronously computing respective heterogeneous motion information related to the motion of the object based on the respective time series of CI.

The various modules discussed above are coupled together by a bus system 1030. The bus system 1030 can include a data bus and, for example, a power bus, a control signal bus, and/or a status signal bus in addition to the data bus. It is understood that the modules of the Origin 1000 can be operatively coupled to one another using any suitable techniques and mediums.

Although a number of separate modules or components are illustrated in FIG. 10, persons of ordinary skill in the art will understand that one or more of the modules can be combined or commonly implemented. For example, the processor 1002 can implement not only the functionality described above with respect to the processor 1002, but also implement the functionality described above with respect to the channel information extractor 1020. Conversely, each of the modules illustrated in FIG. 10 can be implemented using a plurality of separate components or elements.

In one embodiment, in addition to the Bot 900 and the Origin 1000, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 1022 or a motion detector outside the Origin 1000 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

In some embodiments, the present teaching discloses systems and methods for wireless based occupancy detection.

Figure 11:
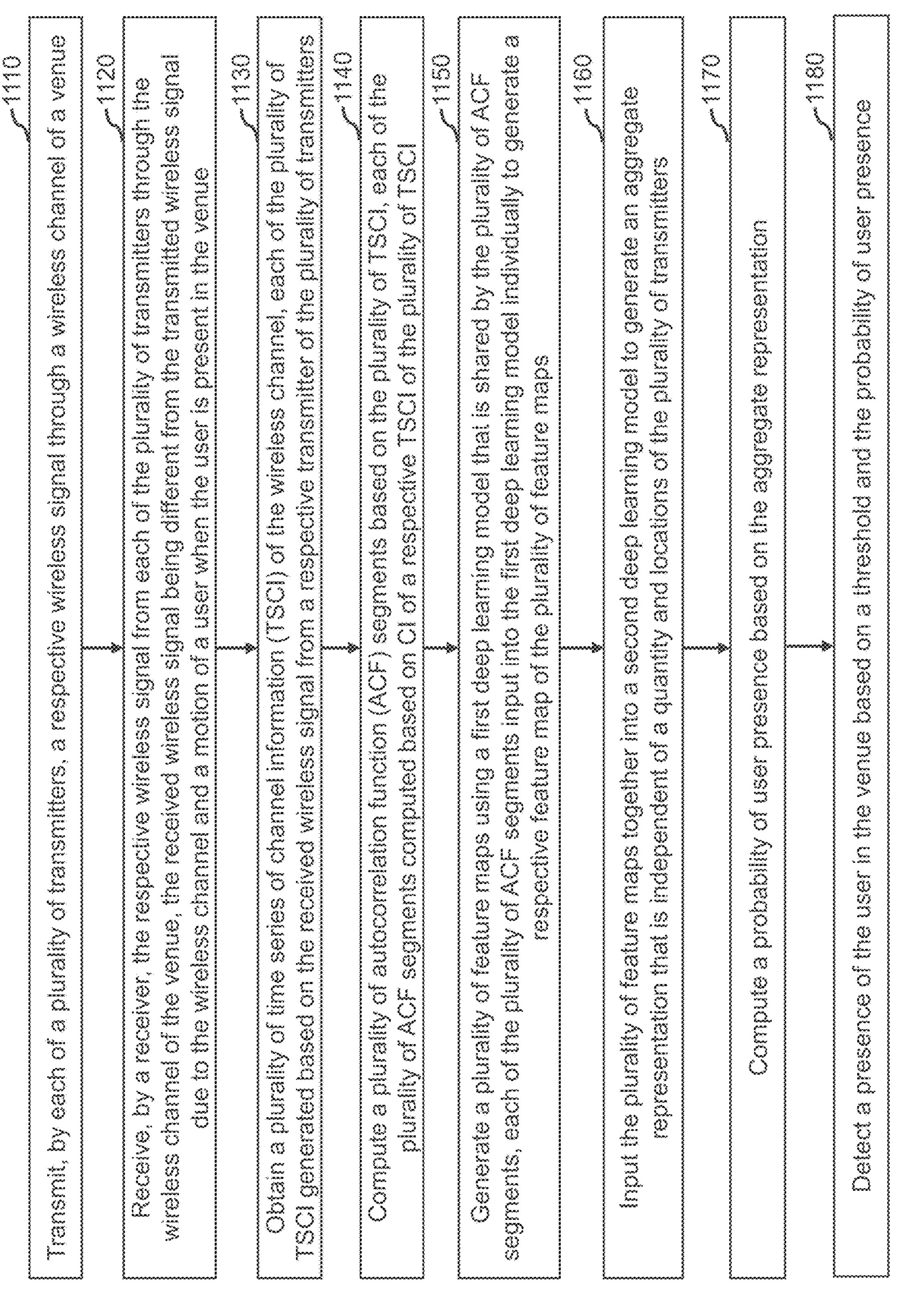
FIG. 11 illustrates a flow chart of an example method for wireless based occupancy detection, according to some embodiments of the present disclosure.

FIG. 11 illustrates a flow chart of an example method 1100 for wireless based occupancy detection, according to some embodiments of the present disclosure. In various embodiments, the method 1100 can be performed by any of the systems disclosed above. At operation 1110, a respective wireless signal is transmitted by each of a plurality of transmitters through a wireless channel of a venue. At operation 1120, the respective wireless signal is received by a receiver from each of the plurality of transmitters through the wireless channel of the venue, the received wireless signal being different from the transmitted wireless signal due to the wireless channel and a motion of a user when the user is present in the venue. At operation 1130, a plurality of time series of channel information (TSCI) of the wireless channel is obtained, each of the plurality of TSCI generated based on the received wireless signal from a respective transmitter of the plurality of transmitters. At operation 1140, a plurality of autocorrelation function (ACF) segments is computed based on the plurality of TSCI, each of the plurality of ACF segments computed based on CI of a respective TSCI of the plurality of TSCI. At operation 1150, a plurality of feature maps is generated using a first deep learning model that is shared by the plurality of ACF segments, each of the plurality of ACF segments input into the first deep learning model individually to generate a respective feature map of the plurality of feature maps. At operation 1160, the plurality of feature maps are input together into a second deep learning model to generate an aggregate representation that is independent of a quantity and locations of the plurality of transmitters. At operation 1170, a probability of user presence is computed based on the aggregate representation. At operation 1180, a presence of the user is detected in the venue based on a threshold and the probability of user presence.

Figure 12:
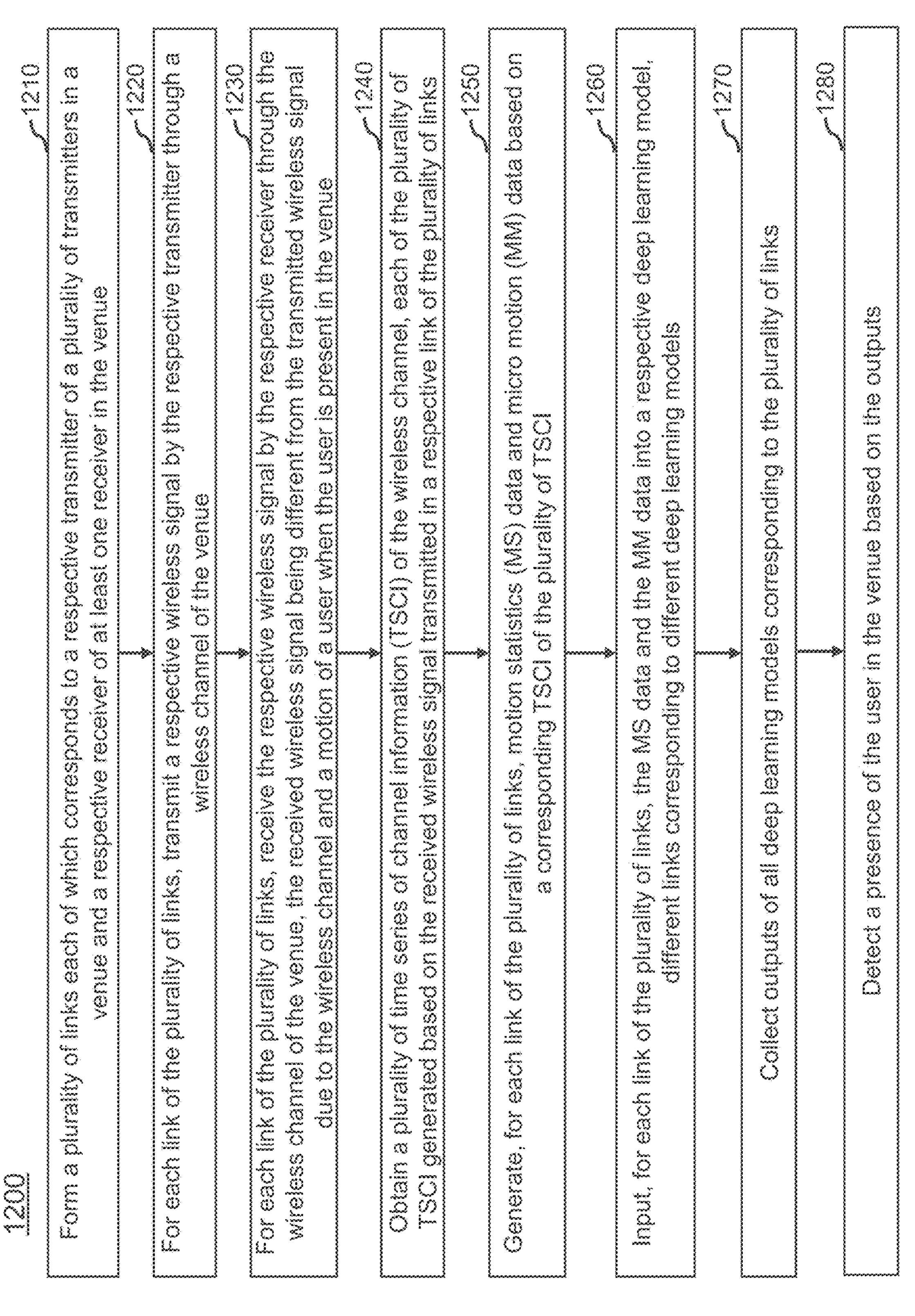
FIG. 12 illustrates a flow chart of another example method for wireless based occupancy detection, according to some embodiments of the present disclosure.

FIG. 12 illustrates a flow chart of another example method 1200 for wireless based occupancy detection, according to some embodiments of the present disclosure. In various embodiments, the method 1200 can be performed by any of the systems disclosed above. At operation 1210, a plurality of links is formed, each corresponding to a respective transmitter of a plurality of transmitters in a venue and a respective receiver of at least one receiver in the venue. At operation 1220, for each link of the plurality of links, a respective wireless signal is transmitted by the respective transmitter through a wireless channel of the venue. At operation 1230, for each link of the plurality of links, the respective wireless signal is received by the respective receiver through the wireless channel of the venue, the received wireless signal being different from the transmitted wireless signal due to the wireless channel and a motion of a user when the user is present in the venue. At operation 1240, a plurality of time series of channel information (TSCI) of the wireless channel is obtained, each of the plurality of TSCI generated based on the received wireless signal transmitted in a respective link of the plurality of links. At operation 1250, for each link of the plurality of links, motion statistics (MS) data and micro motion (MM) data are generated based on a corresponding TSCI of the plurality of TSCI. At operation 1260, for each link of the plurality of links, the MS data and the MM data are input into a respective deep learning model, different links corresponding to different deep learning models. At operation 1270, outputs of all deep learning models corresponding to the plurality of links are collected. At operation 1280, a presence of the user in the venue is detected based on the outputs.

The following numbered clauses provide examples for wireless based occupancy detection.

Clause 1. A system for wireless based occupancy detection, comprising: a plurality of transmitters each of which is configured to transmit a respective wireless signal through a wireless channel of a venue; a receiver configured to receive the respective wireless signal from each of the plurality of transmitters through the wireless channel of the venue, wherein the received wireless signal differs from the transmitted wireless signal due to the wireless channel and a motion of a user when the user is present in the venue; and a processor configured to: obtain a plurality of time series of channel information (TSCI) of the wireless channel, wherein each of the plurality of TSCI is generated based on the received wireless signal from a respective transmitter of the plurality of transmitters, compute a plurality of autocorrelation function (ACF) segments based on the plurality of TSCI, wherein each of the plurality of ACF segments is computed based on CI of a respective TSCI of the plurality of TSCI, generate a plurality of feature maps using a first deep learning model that is shared by the plurality of ACF segments, wherein each of the plurality of ACF segments is input into the first deep learning model individually to generate a respective feature map of the plurality of feature maps, input the plurality of feature maps together into a second deep learning model to generate an aggregate representation that is independent of a quantity and locations of the plurality of transmitters, compute a probability of user presence based on the aggregate representation, and detect a presence of the user in the venue based on a threshold and the probability of user presence.

Clause 2. The system of clause 1, wherein the processor is configured to compute the plurality of ACF segments based at least partially by: computing a time series of ACF (TSACF) based on each TSCI of the plurality of TSCI using a sliding time window; and constructing an ACF segment for each TSCI based on the TSACF, wherein the ACF segment has two dimensions including: a first dimension representing a number of time instances in the sliding time window, and a second dimension representing a number of time lags at each time instance.

Clause 3. The system of clause 2, wherein: the first deep learning model is a convolutional neural network; the first deep learning model comprises a plurality of convolutional layers and at least one max-pooling layer; a non-linear activation function is applied after each of the plurality of convolutional layers; and the first deep learning model, once being trained based on ACF data, is adaptive to any number of transmitters and any number of TSCI.

Clause 4. The system of clause 3, wherein each feature map of the plurality of feature maps is a combination of at least: ACF features related to a moving motion of the user; ACF features related to a breathing motion of the user; ACF features related to a heartbeat motion of the user; and ACF features related to a gait pattern of the user.

Clause 5. The system of clause 4, wherein: the second deep learning model is trained based on a training dataset comprising sample ACF data and domain information representing an environment type associated with the venue; the second deep learning model learns presence related behaviors with different sensitivity levels depending on the environment type; and the environment type associated with the venue indicates at least one of: an ownership type, an intended purpose, a structure, a size, a usage type, or amenities associated with the venue.

Clause 6. The system of clause 5, wherein: the domain information is input into the second deep learning model as a conditioning token; and the second deep learning model is configured to compute attentions based on the conditioning token.

Clause 7. The system of clause 6, wherein: the domain information is input into the second deep learning model by appending a domain embedding for each feature map of the plurality of feature maps based on feature-wise linear modulation.

Clause 8. The system of clause 5, wherein: the domain information is input into the second deep learning model by concatenating the domain information with the aggregate representation.

Clause 9. The system of clause 5, wherein: the second deep learning model is a transformer, wherein positional embeddings corresponding to locations and orders of devices in the venue are removed from the transformer; and the second deep learning model comprises: a classification token which is a learnable embedding with a same dimensionality as each feature map and is configured to aggregate all information from the plurality of feature maps for presence detection, an attention map including attention heads configured to measure an importance of each feature map of the plurality of feature maps and assign a weight to the feature map based on the importance, and a dense layer configured to generate the aggregate representation based on a weighted combination of the plurality of feature maps output by the attention heads.

Clause 10. The system of clause 5, wherein: the second deep learning model is a set transformer, wherein the set transformer is designed to apply independent of the quantity and locations of the plurality of transmitters; and the second deep learning model comprises: a plurality of induced set attention block (ISAB) layers configured to learn device interactions through learned induced points based on attentions computed between the plurality of ISAB layers, and a pooling multi-head (PMA) attention layer configured to adaptively select most relevant transmitters from the plurality of transmitters and combine a set of embedding elements into the aggregate representation having a fixed size.

Clause 11. The system of clause 5, wherein the processor is configured to compute the probability of user presence based at least partially by: inputting the aggregate representation into a classifier to compute a class probability, wherein the class probability represents a likelihood that there is any user present in the venue.

Clause 12. The system of clause 11, wherein the processor is configured to detect the presence of the user based at least partially by: applying a median filter to the class probability to smooth out transient spikes which are considered noise or non-genuine occupancy events, wherein the median filter is configured to analyze the class probability over a time window to generate a smoothed class probability; comparing the smoothed class probability with the threshold, wherein the threshold is predetermined based on a receiver operating characteristic (ROC) curve that is generated based on detection rates and false alarm rates associated with various thresholds; and detecting the presence of the user in the venue in accordance with a determination that the smoothed class probability is greater than the threshold.

Clause 13. The system of clause 12, wherein: the user is one of: a human being, an animal, a living life, a robot, a moving tool, or a moving object controlled by artificial intelligence (AI).

Clause 14. The system of clause 13, wherein the processor is further configured to perform at least one of the following tasks based on a result of presence detection: an energy control task comprising a control of heating, ventilation, air conditioning, lighting, or another application to reduce energy consumption; and a security task comprising identifying, noticing, alerting, or alarming an unauthorized presence in the venue.

Clause 15. A method for wireless based occupancy detection, comprising: transmitting, by each of a plurality of transmitters, a respective wireless signal through a wireless channel of a venue; receiving, by a receiver, the respective wireless signal from each of the plurality of transmitters through the wireless channel of the venue, wherein the received wireless signal differs from the transmitted wireless signal due to the wireless channel and a motion of a user when the user is present in the venue; obtaining a plurality of time series of channel information (TSCI) of the wireless channel, wherein each of the plurality of TSCI is generated based on the received wireless signal from a respective transmitter of the plurality of transmitters; computing a plurality of autocorrelation function (ACF) segments based on the plurality of TSCI, wherein each of the plurality of ACF segments is computed based on CI of a respective TSCI of the plurality of TSCI; generating a plurality of feature maps using a first deep learning model that is shared by the plurality of ACF segments, wherein each of the plurality of ACF segments is input into the first deep learning model individually to generate a respective feature map of the plurality of feature maps; inputting the plurality of feature maps together into a second deep learning model to generate an aggregate representation that is independent of a quantity and locations of the plurality of transmitters; computing a probability of user presence based on the aggregate representation; and detecting a presence of the user in the venue based on a threshold and the probability of user presence.

Clause 16. The method of clause 15, wherein: the first deep learning model is a convolutional neural network; the first deep learning model comprises a plurality of convolutional layers and at least one max-pooling layer; a non-linear activation function is applied after each of the plurality of convolutional layers; the first deep learning model, once being trained based on ACF data, is adaptive to any number of transmitters and any number of TSCI; the second deep learning model is trained based on a training dataset comprising sample ACF data and domain information representing an environment type associated with the venue; and the second deep learning model learns presence related behaviors with different sensitivity levels depending on the environment type.

Clause 17. The method of clause 16, wherein: the second deep learning model is a transformer, wherein positional embeddings corresponding to locations and orders of devices in the venue are removed from the transformer; and the second deep learning model comprises: a classification token which is a learnable embedding with a same dimensionality as each feature map and is configured to aggregate all information from the plurality of feature maps for presence detection, an attention map including attention heads configured to measure an importance of each feature map of the plurality of feature maps and assign a weight to the feature map based on the importance, and a dense layer configured to generate the aggregate representation based on a weighted combination of the plurality of feature maps output by the attention heads.

Clause 18. The method of clause 16, wherein: the second deep learning model is a set transformer, wherein the set transformer is designed to apply independent of the quantity and locations of the plurality of transmitters; and the second deep learning model comprises: a plurality of induced set attention block (ISAB) layers configured to learn device interactions through learned induced points based on attentions computed between the plurality of ISAB layers, and a pooling multi-head (PMA) attention layer configured to adaptively select most relevant transmitters from the plurality of transmitters and combine a set of embedding elements into the aggregate representation having a fixed size.

Clause 19. The method of clause 16, wherein: computing the probability of user presence comprises inputting the aggregate representation into a classifier to compute a class probability, wherein the class probability represents a likelihood that there is any user present in the venue; and detecting the presence of the user comprises: applying a median filter to the class probability to smooth out transient spikes which are considered noise or non-genuine occupancy events, wherein the median filter is configured to analyze the class probability over a time window to generate a smoothed class probability, comparing the smoothed class probability with the threshold, wherein the threshold is predetermined based on a receiver operating characteristic (ROC) curve that is generated based on detection rates and false alarm rates associated with various thresholds, and detecting the presence of the user in the venue in accordance with a determination that the smoothed class probability is greater than the threshold.

Clause 20. A device for wireless based occupancy detection, comprising: a receiver configured to receive a respective wireless signal from each of a plurality of transmitters through a wireless channel of a venue, wherein the received wireless signal differs from the transmitted wireless signal due to the wireless channel and a motion of a user when the user is present in the venue; and a processor configured to: obtain a plurality of time series of channel information (TSCI) of the wireless channel, wherein each of the plurality of TSCI is generated based on the received wireless signal from a respective transmitter of the plurality of transmitters; compute a plurality of autocorrelation function (ACF) segments based on the plurality of TSCI, wherein each of the plurality of ACF segments is computed based on CI of a respective TSCI of the plurality of TSCI; generate a plurality of feature maps using a first deep learning model that is shared by the plurality of ACF segments, wherein each of the plurality of ACF segments is input into the first deep learning model individually to generate a respective feature map of the plurality of feature maps; input the plurality of feature maps together into a second deep learning model to generate an aggregate representation that is independent of a quantity and locations of the plurality of transmitters; compute a probability of user presence based on the aggregate representation; and detect a presence of the user in the venue based on a threshold and the probability of user presence.

The following numbered clauses provide examples for deep learning based occupancy detection.

Clause A1. A system for wireless based occupancy detection, comprising: a plurality of transmitters in a venue; at least one receiver in the venue, wherein: the plurality of transmitters and the at least one receiver form a plurality of links each of which corresponds to a respective transmitter of the plurality of transmitters and a respective receiver of the at least one receiver, for each link of the plurality of links, the respective transmitter is configured to transmit a respective wireless signal through a wireless channel of the venue, for each link of the plurality of links, the respective receiver is configured to receive the respective wireless signal through the wireless channel of the venue, wherein the received wireless signal differs from the transmitted wireless signal due to the wireless channel and a motion of a user when the user is present in the venue; and a processor configured to: obtain a plurality of time series of channel information (TSCI) of the wireless channel, wherein each of the plurality of TSCI is generated based on the received wireless signal transmitted in a respective link of the plurality of links, generate, for each link of the plurality of links, motion statistics (MS) data and micro motion (MM) data based on a corresponding TSCI of the plurality of TSCI, input, for each link of the plurality of links, the MS data and the MM data into a respective deep learning model, wherein different links correspond to different deep learning models, collect outputs of all deep learning models corresponding to the plurality of links, and detect a presence of the user in the venue based on the outputs.

Clause A2. The system of clause A1, wherein the processor is configured to generate, for each link of the plurality of links, the MS data and the MM data based at least partially by: generating the MS data based on the TSCI in the link and a state-time splitter, wherein each channel information (CI) of the TSCI comprises N1 CI components, wherein N1 is an integer greater than one: selecting N2 CI components from the N1 CI components of each CI adaptively for a time window based on a first analysis of the N1 CI components of each CI in the TSCI, wherein N2 is an integer less than or equal to N1; computing a MM statistics for the time window based on the N2 selected CI components of every CI in the TSCI and the first analysis; and generating the MM data based on the MM statistics and the state-time splitter.

Clause A3. The system of clause A2, wherein selecting the N2 CI components for the time window comprises: subdividing the time window into M sub-windows, wherein M is an integer greater than one, for each of the M sub-windows and for each of the N1 CI components, computing a respective first statistics associated with the respective CI component based on the respective CI component of each CI in the respective sub-window, and selecting the N2 CI components for the time window based on the N1*M first statistics, wherein a number of second statistics are computed for the time window based on the N1*M first statistics, wherein the MM statistics is computed for the time window based on the number of second statistics.

Clause A4. The system of clause A3, wherein the processor is further configured to: generate, for each link of the plurality of links, a first training dataset including split MS data and split MM data each of which is split into state data and time data: train the respective deep learning model corresponding to the link using the first training dataset; and store the trained deep learning model before the plurality of TSCI is obtained.

Clause A5. The system of clause A4, wherein the processor is further configured to: re-train, for at least one link of the plurality of links, at least one trained deep learning model corresponding to the at least one link before the plurality of TSCI is obtained, wherein the at least one trained deep learning model is re-trained in response to at least one of: a new environment of the venue, adding or removing a transmitter in the venue, adding or removing a receiver in the venue, or a setup change to any transmitter or any receiver.

Clause A6. The system of clause A5, wherein the processor is further configured to re-train the at least one trained deep learning model based at least partially by: generating a second training dataset including MS data and MM data: automatically generating annotated data for the second training dataset, wherein the annotated data includes annotations for training data in the second training dataset with a highest confidence in a time window among training data in all time windows, wherein the highest confidence is regarding an annotation of user presence or user empty for the venue; re-training model parameters of the at least one trained deep learning model using the second training dataset and the annotated data; and generating an updated deep learning model based on the re-trained model parameters.

Clause A7. The system of clause A6, wherein automatically generating the annotated data comprises: partitioning the MS data and the MM data in the second training dataset into a plurality of time windows after the MS data and the MM data in the second training dataset are collected for a time period covering the plurality of time windows; automatically generating annotations for the partitioned MS data and the partitioned MM data in each of the plurality of time windows, wherein each annotation is generated with a confidence score representing a confidence level regarding the annotation of user presence or user empty for the venue during a corresponding time window; and selecting a time window among the plurality of time windows, such that the partitioned MS data and the partitioned MM data in the selected time window have the highest confidence score among all data in the plurality of time windows.

Clause A8. The system of clause A6, wherein automatically generating the annotated data comprises: storing motion data including MS data and MM data in a database once the motion data is collected for a predetermined time window; automatically generating an annotation for the motion data in the predetermined time window, wherein the annotation is generated with a first confidence score representing a confidence level regarding the annotation of user presence or user empty for the venue during the predetermined time window; collecting new motion data for a new time window having a same length as the predetermined time window; generating a new annotation for the new motion data in the new time window, wherein the new annotation is generated with a second confidence score representing a confidence level regarding the new annotation of user presence or user empty for the venue during the new time window; comparing the first confidence score of the stored motion data with the second confidence score of the new motion data: replacing the motion data in the database with the new motion data in accordance with a determination that the second confidence score is greater than the first confidence score; and repeating the steps of collecting, generating, comparing, and replacing until motion data is collected for a predetermined time period.

Clause A9. The system of clause A6, wherein automatically generating the annotated data comprises: obtaining user feedback including at least one label each of which indicates false positive or false negative regarding an annotation of user presence or user empty for the venue; in response to a label indicating an annotation as false positive, annotating a preceding time window and/or a succeeding time window with a user empty state; and in response to a label indicating an annotation as false negative, annotating the preceding time window and/or the succeeding time window with a user presence state.

Clause A10. The system of clause A6, wherein: the re-training comprises re-training the at least one trained deep learning model based on at least one of: one-shot learning, on-line learning, or layer freezing.

Clause A11. The system of clause A10, wherein: each of the automatically generating and the re-training is performed on a cloud server or a local device in the venue.

Clause A12. The system of clause A11, wherein: the processor is configured to input the MS data and the MM data into a respective deep learning model based at least partially by inputting the MS data and the MM data into the updated deep learning model.

Clause A13. The system of clause A12, wherein the updated deep learning model is at least one of: a neural network, a transformer, or another artificial intelligence (AI) model.

Clause A14. A method for wireless based occupancy detection, comprising: forming a plurality of links each of which corresponds to a respective transmitter of a plurality of transmitters in a venue and a respective receiver of at least one receiver in the venue; for each link of the plurality of links, transmitting a respective wireless signal by the respective transmitter through a wireless channel of the venue; for each link of the plurality of links, receiving the respective wireless signal by the respective receiver through the wireless channel of the venue, wherein the received wireless signal differs from the transmitted wireless signal due to the wireless channel and a motion of a user when the user is present in the venue; obtaining a plurality of time series of channel information (TSCI) of the wireless channel, wherein each of the plurality of TSCI is generated based on the received wireless signal transmitted in a respective link of the plurality of links; generating, for each link of the plurality of links, motion statistics (MS) data and micro motion (MM) data based on a corresponding TSCI of the plurality of TSCI; inputting, for each link of the plurality of links, the MS data and the MM data into a respective deep learning model, wherein different links correspond to different deep learning models; collecting outputs of all deep learning models corresponding to the plurality of links; and detecting a presence of the user in the venue based on the outputs.

Clause A15. A device for wireless based occupancy detection, comprising a processor configured to: obtain a plurality of time series of channel information (TSCI) of a wireless channel of a venue, wherein: a plurality of transmitters in the venue and at least one receiver in the venue form a plurality of links each of which corresponds to a respective transmitter of the plurality of transmitters and a respective receiver of the at least one receiver, for each link of the plurality of links, the respective transmitter is configured to transmit a respective wireless signal through the wireless channel of the venue, for each link of the plurality of links, the respective receiver is configured to receive the respective wireless signal through the wireless channel of the venue, wherein the received wireless signal differs from the transmitted wireless signal due to the wireless channel and a motion of a user when the user is present in the venue, and each of the plurality of TSCI is generated based on the received wireless signal transmitted in a respective link of the plurality of links; generate, for each link of the plurality of links, motion statistics (MS) data and micro motion (MM) data based on a corresponding TSCI of the plurality of TSCI; input, for each link of the plurality of links, the MS data and the MM data into a respective deep learning model, wherein different links correspond to different deep learning models; collect outputs of all deep learning models corresponding to the plurality of links; and detect a presence of the user in the venue based on the outputs.

The following numbered clauses provide examples for child presence detection.

Clause B1. A method for child presence detection, comprising: transmitting a wireless signal by at least one transmitting device through a wireless channel of a venue; receiving the wireless signal by at least one receiving device in the venue, wherein the received wireless signal differs from the transmitted wireless signal due to the wireless channel and a motion of a user when the user is present in the venue; obtaining a time series of channel information (TSCI) of the wireless channel based on the received wireless signal: computing an autocorrelation function (ACF) feature matrix of the TSCI; inputting the ACF feature matrix into a deep learning model to generate a model output, wherein the deep learning model is trained to perform a classification regarding a status of the venue into three classes: an empty class representing an empty status of the venue, a child class representing presence of a child in the venue, and an adult class representing presence of an adult in the venue; and based on the model output, determining whether there is any user present in the venue and whether a present user in the venue is a child or an adult.

Clause B2. The method of clause B1, wherein: the venue is at least one of: a vehicle, a house, a building, or a room; the at least one transmitting device includes a plurality of transmitting devices distributed in the venue; the at least one receiving device includes a plurality of receiving devices distributed in the venue; the plurality of transmitting devices and the plurality of receiving devices form a plurality of links each corresponding to a respective transmitting device of the plurality of transmitting devices and a respective receiving device of the plurality of receiving devices; and the TSCI is obtained based on wireless signals transmitted via the plurality of links.

Clause B3. The method of clause B2, wherein: the ACF feature matrix includes full ACF information of the TSCI; the ACF feature matrix includes ACF computed independently for each subcarrier; and the ACF feature matrix is a two-dimensional matrix having a first dimension representing a total number of subcarriers across the plurality of links, and a second dimension representing a total number of time lags considered when computing the ACF.

Clause B4. The method of clause B3, wherein the deep learning model comprises: a transformer-based encoder configured to extract spatiotemporal representations from the ACF feature matrix; and a multilayer perceptron (MLP) neural network configured to map the spatiotemporal representations to the model output.

Clause B5. The method of clause B4, wherein the transformer-based encoder comprises: an auto-correlation-based attention block configured to learn both subcarrier-local effects and cross-subcarrier dependencies based on cross-correlation scores using learnable linear transformations and Fourier transformations: a series decomposition block configured to separate data into trend components and seasonal components by isolating periodic patterns from static or slowly varying noise; and a feedforward network configured to integrate information across subcarriers using at least two one-dimensional convolutional layers, each followed by an activation function.

Clause B6. The method of clause B5, wherein: the MLP neural network comprises a plurality of fully connected layers, each followed by a rectified linear unit (ReLU) activation function; and the plurality of fully connected layers are configured to: compress the spatiotemporal representations into a low-dimensional representation having a lower dimension than the spatiotemporal representations, and map the low-dimensional representation to three class probabilities each corresponding to a respective one of the three classes: empty class, adult class, and child class.

Clause B7. The method of clause B6, further comprising: performing temporal smoothing by applying a moving average filter to the three class probabilities using a sliding window based on past predictions.

Clause B8. The method of clause B7, further comprising: training the deep learning model based on two stages, by: training, during a first stage, the deep learning model using labeled data collected from indoor environments to generate a pre-trained model, wherein all adult and child data are grouped into a single class labeled as presence; and tuning, during a second stage, the pre-trained model using a modified MLP head designed for a three-class classification task.

Clause B9. The method of clause B8, wherein: the modified MLP head has a higher learning rate compared to the pre-trained model; the modified MLP head is fed with a smaller batch size compared to the pre-trained model; and the tuning comprising: initially freezing layers of the pre-trained model while training only the modified MLP head; and gradually unfreezing the layers of the pre-trained model by employing discriminative learning rates.

Clause B10. The method of clause B9, wherein training the deep learning model comprising: collecting data using diverse antenna configurations: generating synthetic data based on link permutation and link mix between data samples by combining links between classes: generating a training dataset using the collected data and the synthetic data; and training the deep learning model using the training dataset.

Clause B11. A system for child presence detection, comprising: at least one transmitting device configured to transmit a wireless signal through a wireless channel of a venue; at least one receiving device configured to receive the wireless signal, wherein the received wireless signal differs from the transmitted wireless signal due to the wireless channel and a motion of a user when the user is present in the venue; and a processor configured to: obtain a time series of channel information (TSCI) of the wireless channel based on the received wireless signal, compute an autocorrelation function (ACF) feature matrix of the TSCI, input the ACF feature matrix into a deep learning model to generate a model output, wherein the deep learning model is trained to perform a classification regarding a status of the venue into three classes: an empty class representing an empty status of the venue, a child class representing presence of a child in the venue, and an adult class representing presence of an adult in the venue, and based on the model output, determine whether there is any user present in the venue and whether a present user in the venue is a child or an adult.

Clause B12. A device for child presence detection, comprising: a receiver configured to receive a wireless signal from at least one transmitting device through a wireless channel of a venue, wherein the received wireless signal differs from the transmitted wireless signal due to the wireless channel and a motion of a user when the user is present in the venue; and a processor configured to: obtain a time series of channel information (TSCI) of the wireless channel based on the received wireless signal, compute an autocorrelation function (ACF) feature matrix of the TSCI, input the ACF feature matrix into a deep learning model to generate a model output, wherein the deep learning model is trained to perform a classification regarding a status of the venue into three classes: an empty class representing an empty status of the venue, a child class representing presence of a child in the venue, and an adult class representing presence of an adult in the venue, and based on the model output, determine whether there is any user present in the venue and whether a present user in the venue is a child or an adult.

Indoor intrusion detection systems (IDS) play a critical role in security for both residential and commercial spaces. Existing IDS solutions either require dedicated and often expensive equipment deployment from professionals or suffer from annoyingly high false alarm rates (FARs) due to non-human motion. In some embodiments, GuardFi is disclosed, as a robust through-the-wall indoor IDS that mitigates the interference from non-human subjects using ubiquitous WiFi signals. GuardFi includes four key components: a robust signal pre-processing methods to extract environment-independent statistic, a ResNet model to extract features of indoor moving subjects, a Long Short-Term Memory-based state machine to incorporate temporal data for accurate intrusion detection, and few-shot learning to boost system performance on unseen motion sources. GuardFi is independent of the device location, subject's orientation, and environmental changes, enabling swift, efficient, and stable deployment in real-world environments. One can implement GuardFi using a single link of commodity WiFi devices and extensively evaluate GuardFi in six typical indoor environments with various sources of interference from pets, cleaning robots, fans, etc. The results reveal that GuardFi achieves a high intrusion detection accuracy with a low false alarm rate in unseen environments without model re-tuning, underscoring its robustness and potential for ubiquitous indoor security applications.

Intrusion detection systems (IDS), crucial for indoor security, have been developed using various modalities, e.g., camera, audio, and near-infrared sensors. However, each of them bears inherent limitations. Camera and audio-based systems, while accurately detecting intrusions, present significant privacy concerns. Near-infrared systems, better for privacy, require precise placement and are sensitive to environmental factors like temperature, resulting in a high false alarm (FA) rate and reducing user confidence. Additionally, both camera and near-infrared devices work primarily under Line-Of-Sight (LOS) conditions, thus limiting coverage, and necessitate supplementary equipment, making the setup process time-consuming and labor-intensive.

With the proliferation of Internet of Things (IoT) devices, WiFi has become pervasive, leading to innovative attempts at utilizing WiFi signals for indoor intrusion detection. In contrast to camera, sound, and near-infrared-based systems, WiFi-based IDSs offer superior privacy protection and extensive coverage, without the need for extra hardware installation. However, these WiFi-based systems often overlook the fact that disturbances in WiFi signals can be caused by not only humans but also common non-human subjects, such as pets, robotic vacuum cleaners, and household appliances like fans. The ability to discern between the movements of these non-human entities and human movements is paramount to the robustness and practicality of an indoor IDS. While some systems attempt to mitigate FAs from such non-human disturbances, they impose strict requirements on device placement and environmental conditions. In addition, they are mainly effective under LOS conditions, not accounting for the more common but challenging Non-Line-Of-Sight (NLOS) conditions.

In some embodiments, GuardFi is disclosed as the first deep-learning-powered indoor IDS using WiFi, enhanced by effective human and non-human subject differentiation. GuardFi can work with single-link commercial WiFi to detect human intrusions through walls, without requiring additional devices or being limited by environmental complexity, and can handle multi-user intrusions. GuardFi extracts motion characteristics that are independent of the environment, ensuring that the system performance is unaffected by variables such as device location, subject orientation, and environmental changes. Utilizing a neural network model for distinguishing between human and non-human entities. GuardFi effectively mitigates interference caused by non-human movements within the environment. By integrating current spatial information with historical temporal data. GuardFi provides a comprehensive assessment of potential intrusions. One can employ few-shot learning to enhance the system's ability to effectively filter never-before-seen non-human objects in new environments.

However, designing a robust indoor IDS with WiFi poses numerous challenges, three of which are highlighted here.

First, both human and non-human moving subjects within the environment influence the WiFi signal, making it particularly challenging to use single-link commercial WiFi to filter out non-human interference. Although human and non-human subjects of different sizes lead to different influences on the CSI when moving at the same location and are thus relatively easy to distinguish, non-human subjects can cause comparable interference as humans when they are closer to the WiFi device, are more difficult to be filtered and result in high FA. In some embodiments, one can tackle this issue by leveraging deep learning with the widely applied ResNet-18 model to effectively discern motion patterns of human and non-human subjects from data, thereby filtering out non-human movements.

Second, current WiFi-based deep learning networks exhibit significant dependence on the environment and subjects, rendering them ineffective when the environments or subjects change. Although a multitude of domain adaptation techniques has been employed to counteract environmental changes, these techniques require extensive model training within the new environment, necessitating significant user participation, which is both laborious and time-consuming. To tackle the environment-dependency issue, one can use the Augmented Autocorrelation Function (A-ACF) of the channel state information (CSI) as the disclosed network input. The extracted features using the A-ACF are environment-independent, ensuring that the trained network remains unaffected by environmental changes and can be readily deployed in new settings. Furthermore, for previously unseen non-human subjects within a new environment, one can adopt the few-shot learning technique that learns the characteristics of the new subjects with minimal data, bolstering the system robustness across diverse environments and various subjects.

Third, traditional classification-oriented neural networks predominantly focus on identifying the current subject in isolation, often overlooking temporal correlations between sequential detection results. Accurately determining the identity of the current subject by jointly considering both temporal information and the current motion patterns in the environment is challenging. Although most existing models incorporate signal correlations over time and account for these motion patterns in identification tasks, they typically neglect the temporal correlation of the identification results themselves. In some embodiments, one can design a state machine based on Long Short-Term Memory (LSTM) that leverages temporal correlations of motion patterns to enhance the identification accuracy.

GuardFi has been developed and extensively tested on commercial WiFi devices in unseen environments and against both seen and unseen subjects. It is shown to achieve a very high accuracy for identifying human, pets, robotic vacuum cleaners, and fans. As for intrusion detection, it demonstrates an impressive detection rate for human detection within 2.5 seconds on average, accompanied by a low FA, even with a challenging dataset containing data of large pets and multi-human simultaneous intrusion. The high recognition accuracy, low FA rate, being agnostic to environment changes, device position, subject orientation and moving direction under both LOS and NLOS conditions all underscore the disclosed system's robustness and practicality.

A robust WiFi-based IDS is disclosed to classify indoor moving subjects, mitigating the influence of non-human entities like pets and robots on intrusion detection and also ensuring accurate detection with multiple intruders. An environment-agnostic indoor motion source recognition method may be designed based on ResNet-18. The method leverages the A-ACF of CSI as the network input, effectively extracting features only related to subject motion/movements for real-time identification. Since these features are not tied to the environment, device location, or subject moving direction, GuardFi can be employed in new settings without additional training. An LSTM-based state machine is designed to leverage temporal correlations of motion patterns to correct identification outputs based on previous decisions, thereby enhancing accurate identification of the current subject in the environment. The system can use a few-shot learning approach to accommodate unknown subjects, allowing GuardFi to adapt to unfamiliar motion patterns from unknown subjects, further enhancing accuracy during practical application, reducing FAs, and amplifying GuardFi's generalization capabilities and scalability.

Figure 13:
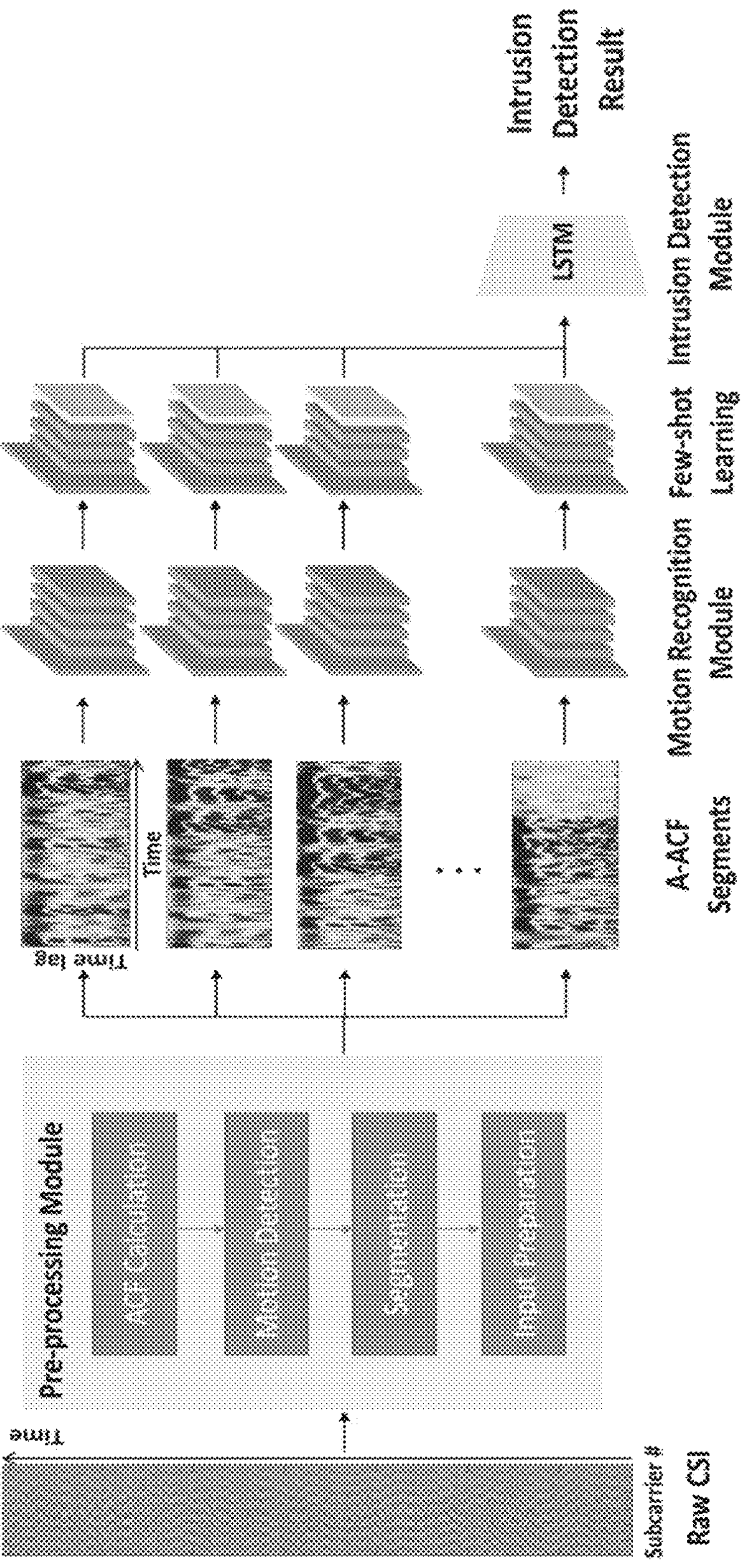
FIG. 13 illustrates an example process for intrusion detection, according to some embodiments of the present disclosure.

In some embodiments, FIG. 13 illustrates a workflow 1300 of the disclosed GuardFi. First, one can preprocess the WiFi signals by computing the A-ACF of the CSI. This allows the system to derive the statistical information encapsulating the influence of dynamic subjects on the propagated signal. During the preprocessing phase, one can segment the A-ACF fragments associated with motion based on the statistical characteristics of the A-ACF. Then, the A-ACF serves as the input of the motion recognition module (MRM) to identify the subject. In some embodiments, this module employs a neural network based on ResNet-18 to analyze the impact of various moving subjects-such as humans, pets, and robot cleaners-on the signal propagation, and extract their motion characteristics for identification purposes. Few-shot learning may be employed to adapt MRM to unseen types of interference when deployed in new environments. Ultimately, one can design an intrusion detection module (IDM) based on the LSTM network that leverages temporal correlations and current motion patterns in the environment to identify intrusion.

WiFi signals, originating from a transmitter, propagate through the environment by reflecting multiple times off various surfaces, including people and objects, before reaching the receiver. WiFi-based sensing systems operate by analyzing the influence of these entities on the propagation of WiFi signals, thereby detecting their movements and changes. CSI captures both the direct signal propagation and the effects of reflection, scattering, and attenuation during transmission. Consequently, it is commonly employed as input for WiFi-based sensing systems. CSI can be expressed as $$H(t, f) = \sum_{l=1}^{L} \alpha_l(t)\exp(-j2\pi f \tau_l(t)),$$

where $a_l(t)$ and $\tau_l(t)$ denote the complex amplitude and propagation delay of the l-th multipath component (MPC), respectively, and L stands for the number of MPCs.

However, CSI embodies the cumulative impact of the environment on signal propagation. It incorporates not only the influence of dynamic entities but also the impact of static objects such as walls, furniture, and floors. As a result, WiFi sensing systems that utilize CSI as direct input are highly sensitive to environmental variations. They exhibit poor domain adaptation capabilities, necessitating data collection and retraining in diverse environments, which hinders their rapid deployment and use in new settings.

To separate the influences of static environments and dynamic entities on the signal, one can extract the A-ACF that exclusively captures the characteristics of dynamic subjects to serve as the network input. Specifically, one can begin by calculating the ACF of the power response G(t, f) by $$\rho_G(\tau, f) = \frac{\mathrm{cov}[G(t, f), G(t+\tau, f)]}{\mathrm{cov}[G(t, f), G(t, f)]} = \frac{\sigma_s^2(f)}{\sigma_s^2(f)+\sigma_n^2(f)}\rho_s(\tau, f) + \frac{\sigma_n^2(f)}{\sigma_s^2(f)+\sigma_n^2(f)}\delta(\tau),$$

where τ is the time lag.

$$\sigma_s^2(f) \text{ and } \sigma_n^2(f)$$

are the propagated signal and noise, respectively, $\rho_s(\tau, f)$ is the ACF of the propagated signal, and δ(T) is the Dirac delta function. Next, one can employ a Maximum Ratio Combine (MRC) approach on the ACF. The aggregated ACF is estimated by:

$$\hat{\rho}_s(\tau) = \sum_{i=1}^{N_s} \rho_G\left(\tau = \frac{1}{F_s}, f_i\right)\rho_G(\tau, f_i),$$

where $N_s$ is the number of subcarriers and $F_s$ is the sampling frequency.

One can take the differential of aggregated ACF $\hat{\rho}_s(\tau)$ to amplify the speed information. Using $\Delta\rho(\tau)$ to denote $$\frac{d\rho(\tau)}{\rho(\tau)},$$

one can express the A-ACF as $\Delta\hat{\rho}_s(\tau)$.

As the A-ACF exclusively captures the dynamic features associated with subject movement, irrelevant to the environment or the subject's direction, the disclosed WiFi sensing system, utilizing A-ACF as input, is robust to variations in the environment and the positioning of subjects. This independence empowers the disclosed system to be rapidly and efficiently deployed in new environments.

Subsequently, one can derive the motion statistic via the ACF and utilize it to detect and segment motion-containing fragments. The motion statistic $\phi(f)$ for a subcarrier with frequency f is defined as the ACF of the CSI H(t, f) with a time lag of $\tau=1/F_s$, where $F_s$ is the sounding rate. That is, $$\phi(f) \triangleq \rho_H\left(\tau = \frac{1}{F_s}, f\right).$$

Motion statistics function as a reliable gauge of movement presence or lack thereof within a given environment. In a stationary environment, the motion statistic $\phi(f)$ is close to 0, whereas in dynamic environments with movement, $\phi(f)>0$. One can partition the A-ACF fragments, detected with motion presence, into segments with a time length of Ts. In some embodiments, experimental results suggest to opt for T=5 for each segment, a decision made to maintain system performance while also shortening real-time detection time and maximally conserving computational resources.

Motion Recognition Module (MRM)

After partitioning the A-ACF of the CSI into segments, one can use these segments as input for the disclosed model designed to distinguish between human and non-human subjects, as illustrated in FIG. 13. The size of an A-ACF input segment is $R^{N_t \times T}$, where T denotes the number of time instances and $N_t$ represents the number of time lag in one instance. This matrix can be interpreted as a 2D spectral image or as an encoded time series. Modern deep neural networks have demonstrated impressive capabilities in feature extraction from both images and time series. Therefore, one can employ a deep neural network for WiFi-based human and non-human feature extraction.

However, due to the unique characteristics of the A-ACF spectrum, which differ from conventional images or time series, existing network architectures may not always yield satisfactory results in WiFi recognition tasks. In contrast to images that typically have three RGB channels, the A-ACF spectrum is limited to a single channel and has lower spatial resolution. Unlike standard encoded time series, the A-ACF function at each instant encapsulates the movement information of the subject at that specific moment, rather than embedding sequential information. Consequently, it is essential to evaluate various network architectures to identify an appropriate deep learning model that is optimally compatible with a WiFi sensing system employing the A-ACF spectrum as its input.

The time series of A-ACF vectors encapsulate critical information regarding the speed, volume size, and motion intensity of moving subjects in the environment. Different networks can extract information from distinct facets of the training data. One objective here is to identify the optimal deep neural network model and the corresponding architecture that can offer robust WiFi-based human and non-human recognition across diverse environments and subjects, one can have evaluated the performance of popular neural networks, including CNNs, RNNs and Transformers, in discerning between human and non-human subjects. Ultimately, one can selected the ResNet-18 model, which demonstrated consistent performance across a variety of environments and subjects and requires relatively fewer computational resources.

LSTM-Based Intrusion Detector Module (IDM)

In the previous step, one can segment the WiFi signal and identify the moving subjects within each segment based on the characteristics of their A-ACF. However, this approach overlooks the temporal correlation amongst the A-ACF segments. The MRM does not consider the time dependency that exists between A-ACF segments. For instance, if a moving subject is detected and recognized in an environment, it is highly probable that the motion detected subsequently will be due to the same subject. By incorporating the historical information about subject detection in the environment, one can more accurately ascertain the presence of intrusions and filter out FAs triggered by animals.

Figure 14:
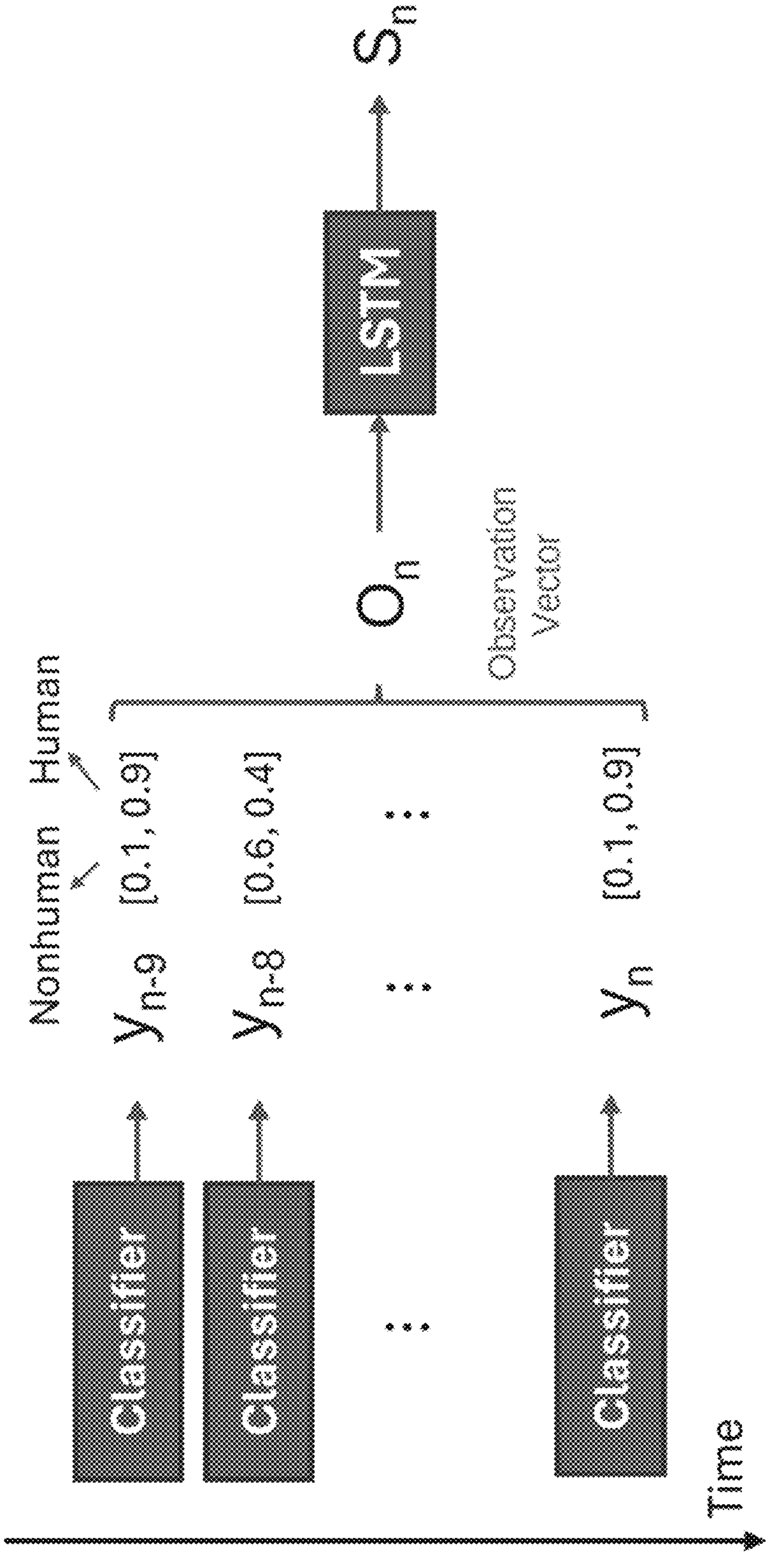
FIG. 14 illustrates an example Long Short-Term Memory (LSTM) neural network for intrusion detection, according to some embodiments of the present disclosure.

Inspired by the impressive performance of ConvLSTM in video classification and LSTM's effectiveness in time series signal classification, one can design a temporal information extractor based on LSTM, as depicted in FIG. 14. Its input comprises the probability values output by feature extractor from current and past A-ACF segments, while its output is a determination of the presence of an intrusion. An LSTM unit is composed of a cell with memory state Ct, an input gate it, an output gate and a forget gate. FIG. 14 illustrates the LSTM-based intrusion detector.

One can evaluate the performance of the LSTM-based intrusion detection module, demonstrating that it can substantially reduce the likelihood of FAs triggered by non-human subjects.

Few-Shot Learning

Figure 15:
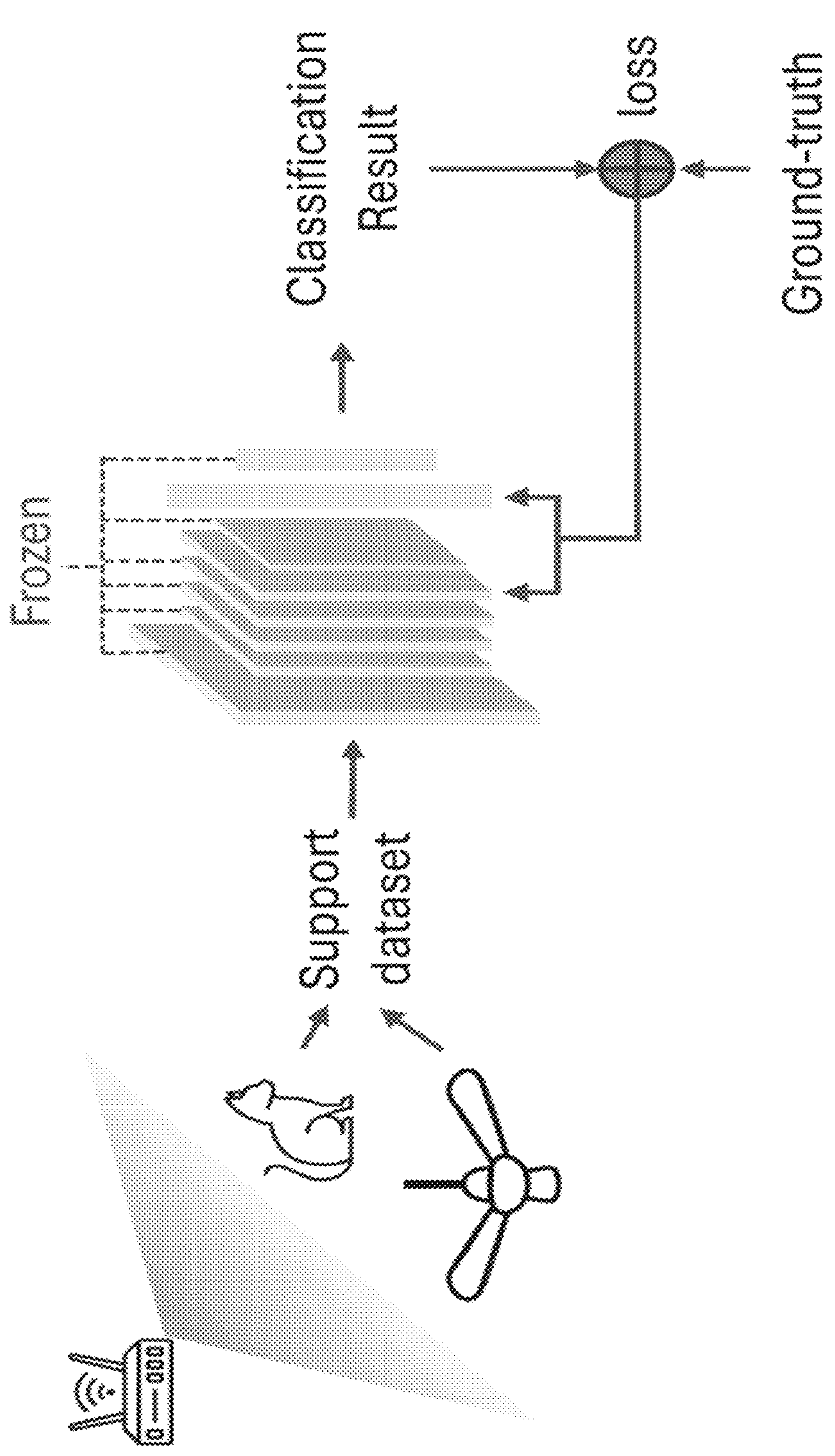
FIG. 15 illustrates an example few-shot learning process, according to some embodiments of the present disclosure.

The A-ACF extraction method removes environmental factors, freeing the system from constraints related to environment. However, when applied in new settings, non-human subjects not seen in the training dataset may arise, such as fans operating in different modes or various pets. Deep learning-based models usually cannot guarantee high accuracy for unseen data patterns. To ensure the robustness of the disclosed system against unknown non-human subjects, one can employ a few-shot learning approach, enabling the model to quickly adapt to new motion patterns and thereby ensuring a low false alarm rate. To maintain minimal computational resource requirements and prevent the model from forgetting data distribution learned from the training dataset, one can only fine-tune the forth Res-block and fully connected layer of the neural network using 20 effective motion segments from each unseen subjects in new environments, without altering the feature extraction part of the ResNet-18. The specific operations are illustrated in FIG. 15.

As such, GuardFi is disclosed as a novel system leveraging single-link WiFi for precise indoor human intrusion detection, even through walls. Unlike many existing systems that struggle with non-human interference-induced FAs, GuardFi stands out with its advanced deep learning framework. In some embodiments, it integrates a ResNet-18-based feature extractor for distinguishing human from non-human motions and an LSTM-driven detector for historical data assimilation. Importantly, with A-ACF input, GuardFi can be versatile across various environments and orientations. Rigorous tests affirm its exceptional real-world performance and readiness for swift, hassle-free deployment in new settings.

As WiFi has become a ubiquitous medium for communication, its role in sensing applications has expanded.

However, the current WiFi sensing applications are limited by their assumption that any detected motion signifies human activity, overlooking the potential impact of non-human subjects. Existing attempts to recognize the interference from non-human motion impose stringent requirements regarding device positioning, data quality, environmental complexity, and non-human subject categories. In some embodiments, a robust deep learning framework, SrcSense ("Source Sense"), is disclosed to recognize the motion source with WiFi signals through the wall. SrcSense extracts environment-independent features from single-link WiFi. One can investigate the performance of popular deep neural networks and explore the efficacy of transferring pre-trained models to WiFi sensing tasks. One can implement SrcSense and evaluate the performance in five real-world complex environments with commodity WiFi devices. In some embodiments, with a challenging dataset considering large pets, diverse human activities and multiple subjects coexisting cases, SrcSense achieves a high average validation accuracy across five distinct environments and a high average testing accuracy in unseen environments without further model training or parameter tuning. In some embodiments, by accumulating 20 seconds of WiFi data. SrcSense can achieve an elevated recognition accuracy with ResNet-50. These results underline the robustness of the disclosed approach and its readiness for integration into ubiquitous intelligent IoT systems and applications.

WiFi has become ubiquitous, serving as a principal mode of communication nearly everywhere. Beyond connectivity, WiFi Channel State Information (CSI) captures environmental details, enabling it to "visualize" subjects within an area and powering numerous sensing applications. Compared to cameras and millimeter-wave radar, WiFi offers broader coverage, operates under both line-of-sight (LOS) and non-line-of-sight (NLOS) conditions, and ensures superior privacy.

Despite these advantages, most WiFi sensing applications assume that any detected motion is due to human activity, overlooking non-human subjects. Distinguishing between human and non-human motion is challenging because both induce similar CSI variations. Yet, non-human elements like pets, robotic vacuums, and fans are prevalent in many settings. Accurate recognition of moving subjects in smart environments is vital for enhancing safety, energy efficiency, user interaction, and health monitoring. Differentiating humans from non-human subjects prevents false alarms in security systems, improves energy efficiency by shutting down unattended appliances, and allows IoT devices to adjust settings appropriately. In health monitoring, distinguishing pet from human movement ensures accurate insights. Therefore, developing robust intelligent sensing systems capable of identifying the source of motion is essential, especially in residential environments where humans, pets, and automated devices are prevalent.

Prior efforts to recognize the motion source using WiFi generally fall into two categories: traditional model-based and machine learning-based. Model-based methods offer good interpretability but require precise equipment placement and are less effective in complex environments. Machine learning-based methods, using extracted features, mitigate these limitations and have broader applicability while retaining interpretability. However, the performance of traditional machine learning models hinges on the efficacy of these manually designed features. Their performance is compromised when these features cannot be accurately derived from the data. In addition, models using traditional machine learning classifiers like Support Vector Machines (SVM) often underperform in scenarios where different classification categories are not distinctly separate, leading to significant overlaps in the feature space. These models also struggle with data that is not linearly separable.

In recent years, deep learning models have achieved remarkable success in fields such as image and speech processing, showcasing their potential to extract and classify features from high-complexity and high-dimensional data. This has sparked more works employing deep learning in the realm of WiFi sensing. However, these works often adopt a specific pre-existing network framework, leading to a dearth of exploration on the suitability of different models for WiFi sensing tasks. More importantly, most deep learning-based WiFi sensing systems are unable to mitigate the impact of environmental factors. Consequently, the trained networks often falter when transposed into new environments. Various strategies for domain adaptation require extensive user data and computational resources to retrain or tweak the model in a new environment.

In some embodiments, SrcSense ("Source Sense") is designed as the first environment-independent deep learning-based framework to recognize motion sources with WiFi signals through the walls. Leveraging the pervasive WiFi signals, SrcSense can robustly identify the motion from a wide range of human and non-human subjects, including pets, cleaning robots, and electrical appliances non-intrusively in real-world complex environments, where the subjects can freely engage in a variety of activities without spatial constraints. SrcSense can handle complex situations such as individuals crawling or the simultaneous movement of multiple people. SrcSense is also independent of the subject's location and orientation, and invariant to environmental changes, eliminating users' effort for deployment into new environments and requiring minimal computational resources. SrcSense can further capitalize on models pre-trained with large datasets of other modalities to further enhance its performance.

However, achieving such a robust framework is nontrivial and entails critical challenges.

First, deep neural networks require extensive datasets for optimal performance, but collecting real-world WiFi data of non-human subjects without human interference is extremely difficult. Existing studies lack comprehensive datasets that include various non-human subjects like pets, cleaning robots, or fans. Moreover, existing research predominantly captures WiFi data of human movement in controlled laboratory settings, which do not reflect the complexity of real-world. This limitation hinders model generalization and poses a significant barrier to the practical application and scalability of WiFi sensing technologies. In some embodiments, one can collect WiFi CSI with commercial edge devices and utilize a robust motion statistic to automatically extract the data containing motion. The constructed dataset covers a wide range of humans, pets, cleaning robots, and fans in 5 typical real-world environments over a long time period.

Second, existing deep learning-based WiFi sensing works rely on raw CSI and cannot remove context information, leading to failure in new environments and necessitating retraining with a large amount of data, which is time-consuming and resource-intensive. While domain adaptation techniques can mitigate some of these demands, they still require user effort and are difficult to deploy on edge devices with limited computational capabilities. In some embodiments, the system can use a new statistic, the Amplified Auto-correlation Function (A-ACF) of CSI, as input to deep neural networks, making the model independent of environment, subject location, and orientation. This approach enables easy deployment in new settings without retraining or fine-tuning, minimizing user effort and computational demands.

Third, although deep learning models have excelled in computer vision and natural language processing tasks, their suitability for WiFi sensing, especially with the disclosed unique A-ACF input, remains unclear. Existing research often adopts specific models without tailored performance comparisons, hindering the understanding of which models are most appropriate for their WiFi sensing tasks. In some embodiments, one can conduct a comprehensive evaluation of ten different models, encompassing Feed-forward Neural Networks (FNN), Convolutional Neural Networks (CNN), Recurrent Neural Networks (RNN), and Vision Transformers, to assess their performance on the disclosed specific task.

Furthermore, due to the limited availability of WiFi data, enhancing the performance of networks based on restricted WiFi datasets is particularly challenging. Since the dimensional and temporal characteristics of WiFi data differ significantly from other modalities, it is not straightforward to transfer models trained on large datasets of other modalities to improve WiFi sensing performance. Different from existing deep learning-based WiFi sensing systems, SrcSense extracts the A-ACF from CSI, which shares similar dimensions and features with images. Consequently, one can employ transfer learning techniques to adapt models that have been pre-trained on extensive image datasets to WiFi sensing tasks, thereby further improving the performance of deep neural network models in WiFi sensing applications.

In some embodiments, one can implement SrcSense on commodity off-the-shelf (COTS) WiFi devices and conduct extensive experiments in 5 distinct real-world environments, including a townhouse, a single-family house, two apartments, and a typical office space, one can collect data from 13 humans, 11 pets, a cleaning robot and 3 fans over 6 months. Data may be collected under both LOS and NLOS conditions. Based on data from the past 5-second window, SrcSense achieves an average validation accuracy across 5 real-world complex scenarios for 4-class classification and a high average testing accuracy in unseen environments without model re-training or parameter tuning. It can be further improved with transfer learning to a high recognition accuracy. Using a longer window of 20 seconds, SrcSense demonstrates an elevated recognition accuracy with the ResNet-50 model. The superb accuracy and resilience not only establish SrcSense as a cutting-edge framework for robust motion source recognition in ubiquitous contexts but also revolutionize the way WiFi sensing is approached for intelligent systems in practical and complicated scenarios.

In some embodiments, the present disclosure discloses the first comprehensive WiFi dataset for human and non-human subjects movement in the real-world context, e.g. by collecting WiFi data of 13 humans with diverse activities including walking, sneaking, running, and crawling, 11 pets including dogs and a cat engaging in daily activities, cleaning robots and three identical fans. A novel indoor motion source recognition framework is built with deep neural networks based on the disclosed environment-independent statistic A-ACF extracted from CSI. As A-ACF is independent of environmental conditions, subject location and orientation, SrcSense is immune to variations in the environment. Furthermore, one can compare the efficacy of classic deep neural networks in identifying motion sources in various environments using WiFi. The networks performance is extensively evaluated under known and unknown environments, including situations with unseen subjects and multiple concurrent subjects in unseen settings. One can demonstrate the viability of transferring pre-trained models using a large image dataset to the WiFi sensing task.

A domain-resilient feature sculpting method is disclosed for WiFi-based sensing systems, including environment-invariant statistics extraction, motion segment detection and efficient model input design.

WiFi signals, originating from a transmitter, traverse the environment while reflecting multiple times off various surfaces, including people and subjects, before reaching the receiver. WiFi-based sensing systems detect the movements and changes within the environment by analyzing the influence of people and subjects on the propagation of WiFi signals. As CSI encapsulates the processes of reflection, scattering, and attenuation during such, it is commonly employed as the input for WiFi-based sensing systems. However, since CSI encompasses all WiFi signal paths including those affected by environmental elements like walls and furniture, existing CSI-based systems often fail to generalize across environments as variations in these static elements introduce noise, leading the model to learn irrelevant features. This restricts their practical use and broader applicability.

Inspired by the rich scattering multipath model, one can develop a method to extract statistical data directly related to motion sources from the CSI, enhancing the model's focus on motion-relevant information and reducing interference from environmental changes. In some embodiments, this approach not only improves the model's generalization capabilities, allowing it to operate effectively in new environments without additional training but also offers several benefits: it increases data efficiency by reducing the need for large datasets typically required to filter out static-object interference: improves interpretability with a mathematical method, which can further estimate physically interpretable characteristics such as speed and gait; and enhances scalability and flexibility, accommodating a wide range of data format, device types and machine learning models. Additionally, unlike other CSI preprocessing methods, the disclosed approach effectively processes both Line-of-Sight (LOS) and Non-Line-of-Sight (NLOS) conditions, enabling through-the-wall recognition and expanding system coverage significantly.

Due to the multipath effect, CSI is generally represented as a collection of radio propagation along different paths:

$$H(t, f) = \sum_{l=1}^{L} \alpha_l(t) e^{-j2\pi f \tau_l(t)}, \tag{2}$$

where $\alpha_l$ is the multipath coefficient of the l-th component and $\tau_l$ is the associated propagation delay.

In practice, since the imperfect synchronization of the commercial WiFi devices often results in random noise in the CSI phase that is difficult to efficiently clean, researchers usually rely on the more reliable CSI amplitude, which can be measured through the power response G(t, f) as $$\begin{aligned} G(t, f) &\triangleq \left|\tilde{H}(t, f)\right|^2 \\ &\triangleq |H(t, f)|^2 + n(t, f) \end{aligned} \tag{3}$$

where n(t, f) is the additive white Gaussian noise (AWGN) with a power density of $$\sigma_n^2(f)$$

and is statistically independent of $|H(t, f)|^2$.

In indoor environments, rich scattering occurs due to both static and dynamic scatterers. Static scatterers comprise walls, floors, and stationary furniture, while dynamic scatterers include moving individuals or objects. The superposition principle of electromagnetic (EM) waves allows one to decompose CSI as follows:

$$H(t, f) = \sum_{i \in \Omega_s(t)} H_i(t, f) + \sum_{j \in \Omega_d(t)} H_j(t, f) + \varepsilon(t, f), \quad (4)$$

where $\Omega_s(t)$ represents the set of static scatterers, $\Omega_d(t)$ corresponds to the set of dynamic scatterers. $H_i(t, f)$ and $H_j(t, f)$ represent the contributions of the i-th and j-th scatterers respectively. The noise term, $\epsilon(t, f)$, is statistically independent of $H_i(t, f)$ and $H_j(t, f)$. Each scatterer acts as a "virtual transmitter", scattering its received EM waves around. The CSI represents the aggregate of the electric fields of all incoming EM waves.

Based on the rich scattering multipath model, $G(\tau, f)$ is a result of numerous multipath components adding up together in a complex way expressed in Equation (2). One can express $|H(t, f)|^2$ in the following form:

$$|H(t, f)|^2 = g(f)s(t - \Delta t_f), \quad (5)$$

where s(t) denotes the motion signal generated by the motion source, and g(f) and $\Delta t_f$ stand for the gain and the random initial phase of the motion signal measured at the frequency f, respectively. Combining Equation (3) and Equation (5), the received signal at subcarrier with frequency f is expressed as $$G(t, f) = g(f)s(t - \Delta t_f) + n(t, f),$$

The ACF of G(t, f) can be derived as:

$$\rho_G(\tau, f) = \frac{\operatorname{cov}[G(t, f), G(t + \tau, f)]}{\operatorname{cov}[G(t, f), G(t, f)]} = \frac{g^2(f)}{g^2(f) + \sigma_n^2(f)} \rho_s(\tau) + \frac{\sigma_n^2(f)}{g^2(f) + \sigma_n^2(f)} \delta(\tau),$$

where $\tau$ is the time lag and $\delta(\bullet)$ is the Dirac delta function. $\rho_s(t)$ is the ACF of the motion signal. The normalized channel gain at frequency f is defined as $$w(f) = \frac{g^2(f)}{g^2(f) + \sigma_n^2(f)}.$$

When $\tau = \rightarrow 0$, one can have:

$$\lim_{\tau \to 0} \rho_G = w(f) \lim_{\tau \to 0} \rho_s(\tau).$$

Since the movement of the subject is continuous, one can have $\lim_{\tau \to 0} \rho_s(\tau) = 1$ and then $w(f) = \lim_{\tau \to 0} \rho_G$. When the sounding rate $F_s$ is high, one can estimate the channel gain by w(f) by $$\rho_G\left(\tau = \frac{1}{F_s}, f\right).$$

The ACF, $\rho_G(\tau, f)$, can be further derived based on the statistical theory of EM waves as $$\rho_G(\tau, f) = \frac{\sum_{i \in \Omega_d} g_{i^2}(f)}{\sum_{i \in \Omega_d} g_{i^2}(f) + \sigma_n^2(f)} J_0(kv_i\tau) + \frac{\sigma_n^2(f)}{\sum_{i \in \Omega_d} g_{i^2}(f) + \sigma_n^2(f)} \delta(\tau).$$

Here, $J_0(\bullet)$ is the Bessel function of the first kind, given by $$J_0(x) = \frac{1}{2\pi} \int_0^{2\pi} \exp(-jx\cos(\theta)) d\theta. \; g_i(\cdot)$$

denotes the channel gain of the MPC for the i-th scatter, and $$k = \frac{2\pi}{\lambda}$$

is the wave number where $\lambda$ is the wavelength.

Considering speeds of all scatters caused by the subject are approximated to be the same, and for $\tau \neq 0$, one can have $$\rho_G(\tau, f) = g(f) J_0(kv_i\tau)$$

When all frequencies are considered, the g(f) factor will be aggregated and disappear, and the PG (t) is independent of specific location and environment.

Based on the ACF, one can further extract the A-ACF by applying the Maximum Ratio Combine (MRC) and taking the first derivative. Employing MRC, one can combine all subcarriers to enhance the Signal-to-Noise Ratio (SNR) of the ACF, thereby accentuating the impact of the moving subject on the signal. The aggregated ACF is achieved by setting the optimal weight k*(f) to $\rho_G$ $$\left(\tau = \frac{1}{F_s}, f\right)$$

and can be estimated by:

$$\hat{\rho}_A(\tau) = \sum_{i=1}^{N_s} k * (f) \rho_G(\tau, f_i) = \sum_{i=1}^{N_s} \rho_G\left(\tau = \frac{1}{F_s}, f\right) \rho_G(\tau, f_i).$$

where $N_s$ is the total number of subcarriers.

In some embodiments, one can take the differential of aggregated ACF $\hat{\rho}_A(T)$ to amplify the speed information. Using $\Delta\rho(\tau)$ to denote $$\frac{d\rho(\tau)}{\rho(\tau)},$$

one can express the A-ACF as $\Delta\hat{\rho}_A(\tau)$.

A test result may illustrate the CSI of different moving subjects: human movement (a, b), pet activity (c, d), and a robot vacuum cleaner operation (e, f). The first set (a, b, c) comes from environment A, while the second set (d, e, f) from environment B. The furniture in environment B was moved between each data collection session. It is evident that environmental factors dominate CSI variations, substantially overriding the effects of different moving subjects, making it hard to extract motion-related features. Therefore, it is crucial to eliminate the dependency of environmental contexts for WiFi sensing systems to extract intrinsic statistics only related to motion and further enhance accuracy and deployment feasibility.

In some embodiments, one can present the results after extracting A-ACF from the CSI data. In some embodiments, the motion characteristics of the same type of subject in different environments are similar. Meanwhile, the A-ACF patterns of different moving subjects show significant discrepancies, irrespective of whether they are in the same or different environments.

Additionally, one can compare the CSI and A-ACF of human walking at different locations and environments, one can collect two sessions of human walking data from two environments, including a typical office building, Scenario V, and a single-family house, Scenario III. one can collect data in Scenario V with two setups, setting #1 and #3. Based on test results, one can find that the CSI of different locations is different while the A-ACF is robust to location difference. One can also find that unlike CSI, the A-ACF of a human walking pattern is robust to environmental changes.

As the A-ACF encapsulates only the dynamic features associated with subject movement, devoid of any environmental or directional information of the subject, the disclosed WiFi sensing framework, utilizing A-ACF as input, is immune to variations in the environment and the positioning of subjects. SrcSense focuses on extracting the more intrinsic features correlated to the movement of subjects, disregarding aspects such as the subject's orientation, position, and the surrounding environment. This independence empowers SrcSense to be rapidly and efficiently deployed within new environments.

Subsequently, one can derive the robust motion statistic from the A-ACF and utilize it to detect and segment motion-containing CSI data fragments. For the power response G(t, f), the robust motion statistic derived from its A-ACF at time t over subcarrier f is defined as $$\phi_G(f) \triangleq \rho_G\left(\tau = \frac{1}{F_s}, f\right),$$

where $F_s$ is the sounding rate.

In some embodiments, the robust motion statistics may serve as an effective tool for accurately detecting the presence or absence of movement within a specific environment. In a stationary environment, the robust motion statistic $\phi_G(f)$ is close to 0, whereas in dynamic environments with movement, $\phi_G(f)>0$. Following this, one can partition the A-ACF into 5-second segments that are detected to encompass motion. The extracted A-ACF segment is a 2D (two-dimensional) matrix with size $R^{N\times T}$, where N is the total number of time lags at each time instance, and T is the number of time instances in a segment.

In some embodiments, in response to the varied model types, one can further transform the 2D A-ACF segment into inputs that align with respective models. This mainly includes the following four cases:

The first case is input for FNN. In feed-forward neural networks (FNNs), each sample is typically represented as a flattened, one-dimensional vector. The reason for this is that FNNs are designed to process each feature independently, without considering any inherent structure or correlation between features. Hence, the 2D A-ACF segment $R^{N\times T}$ is flattened into a 1D vector $R^{NT}$ to fit the input requirement of FNNs.

The second case is input for Image-based Models. Unlike FNNs, image-based models like convolutional neural networks (CNNs) are designed to handle multi-dimensional data particularly, such as images, while preserving spatial relationships between pixels or features. Thus, one can directly feed the 2D A-ACF segment into image-based models.

The third case is input for Language-based Models. Language-based models like recurrent neural networks (RNNs) are particularly suited to handle sequential data, where the order of inputs matters. They maintain a hidden state that can theoretically capture information about past elements in the sequence. Hence, the typical input for an RNN is a sequence. In this setup, the sequence of A-ACF vectors $R^N$ is fed into the network one at a time.

The fourth case is input for Transformer-based Models. Transformer-based models have been applied for both Natural Language Processing (NLP) tasks and vision tasks. For both kinds of tasks, the transformer models handle data in a similar sequential manner. For a 2D A-ACF segment, it is divided into P small patches $R^{h\times w}$. These patches are then flattened into a ID vector $R^{hw}$. Positional embeddings are added to the vectors to provide information about the relative positions of patches in the original image.

Figure 16:
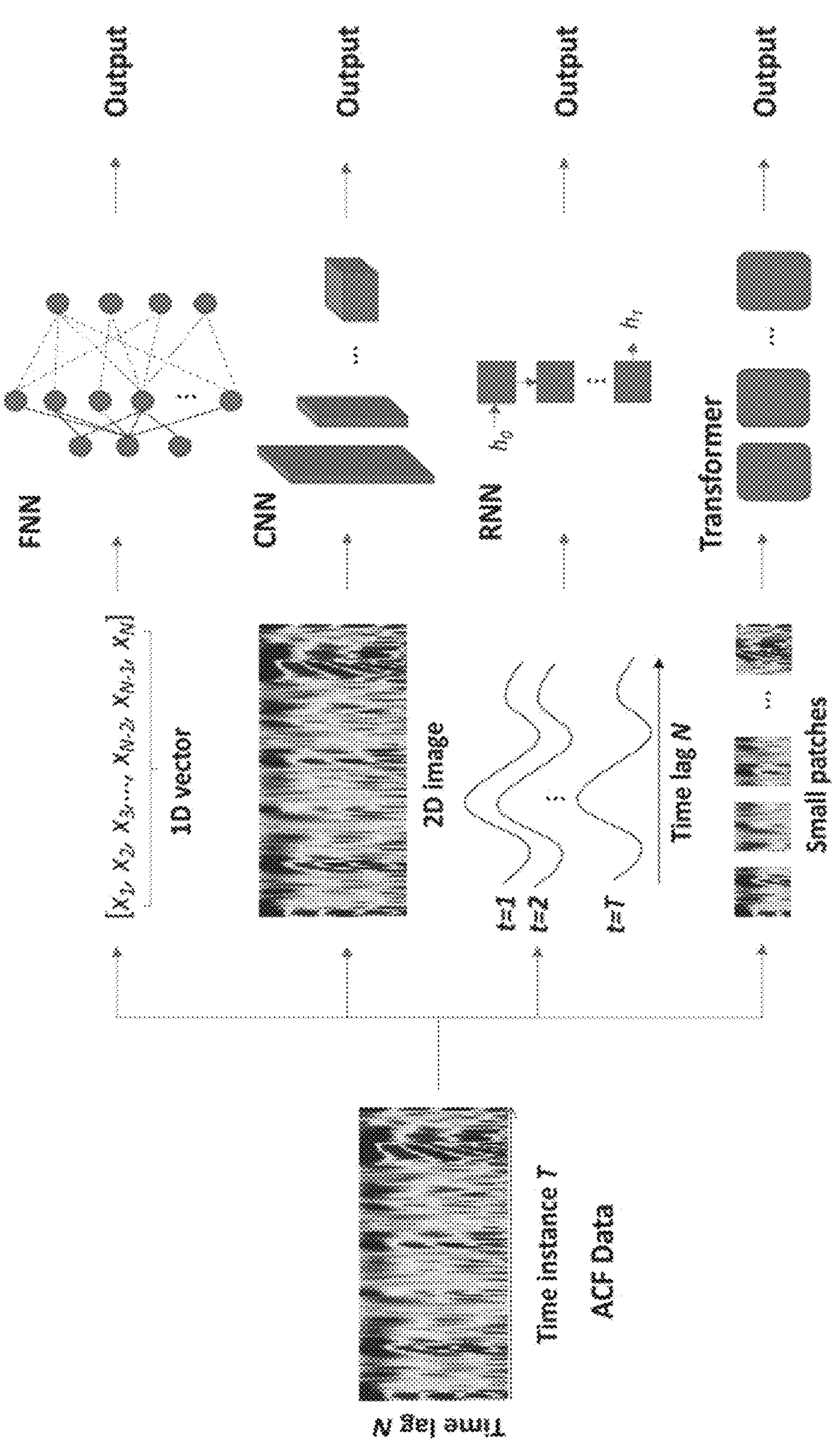
FIG. 16 illustrates an example data input preparation process for motion source recognition, according to some embodiments of the present disclosure.

FIG. 16 provides an intuitive depiction of the process 1600 by which A-ACF data is integrated into these models.

The following gives an overview of deep learning models integrated with the Amplified Auto-correlation Function (A-ACF) for motion source recognition using WiFi signals. One can analyze the strengths and limitations of each model within the disclosed domain-resilient framework and discuss the application of transfer learning in this context.

In some embodiments, Feed-forward Neural Networks (FNNs), such as the Multilayer Perceptron (MLP), allow information to flow unidirectionally from input to output layers without loops. In the disclosed application, the MLP takes the flattened A-ACF as input and maps features into categorical outputs using nonlinear activation functions. While MLPs can model complex non-linear relationships, they do not explicitly capture spatial or temporal dependencies, making them less effective for modeling the spatiotemporal characteristics inherent in A-ACF data. Consequently, MLPs may be less suited for distinguishing between human and non-human motion sources using WiFi signals.

In some embodiments, Convolutional Neural Networks (CNNs) are adept at learning spatial hierarchies of features and are widely used in image processing tasks. By treating the A-ACF as a 2D image input, CNNs apply 2D convolutional kernels to extract spatial features that capture motion characteristics. This approach leverages parameter sharing to reduce the number of parameters, enhancing computational efficiency and mitigating overfitting risks. However, CNNs primarily focus on local patterns and may overlook long-range dependencies or global context in the data. one can evaluate the performance of CNN architectures such as LeNet, ResNet-18, ResNet-50, and ResNet-101 for classifying human and non-human motion sources using WiFi signals.

In some embodiments, Recurrent Neural Networks (RNNs) process sequential data by passing information across time steps, making them suitable for time series analysis. Advanced variants like Long Short-Term Memory (LSTM) and Gated Recurrent Units (GRU) address the limitations of standard RNNs in capturing long-range dependencies. One can model the A-ACF as a time series, allowing RNNs to capture temporal dependencies relevant to motion features. However, they may overlook instantaneous features associated with short-term motion. One can evaluate standard RNNs, LSTMs, and GRUs for WiFi-based motion source recognition.

In some embodiments, transformers utilize self-attention mechanisms and have achieved state-of-the-art results in natural language processing and computer vision tasks. Unlike RNNs, transformers process input data in parallel, enhancing efficiency and the ability to capture complex patterns. To effectively model the two-dimensional features of the A-ACF, one can employ the Vision Transformer (ViT). ViT processes the A-ACF by splitting it into fixed-size image patches, reshaping them into vectors, and adding positional embeddings. These embeddings are input to a transformer encoder composed of multi-head self-attention modules and feed-forward networks. The output is used by a classification head to predict human versus non-human motion sources.

In some embodiments, transfer learning is particularly useful when the target task has limited labeled data. It is a standard practice in deep learning, where models trained on large-scale image datasets are used for other vision tasks. Given the scarcity of labeled WiFi data, by transforming the raw WiFi signals into a 2D A-ACF image segment, one can aim to investigate the feasibility of leveraging pre-trained image models in WiFi sensing tasks. Utilizing A-ACF segment images as the input for the transfer learning network, one can transfer characteristics learned by deep neural networks from image data to the WiFi-based human and non-human motion identification task, to augment WiFi sensing performance. One can assess the efficacy of transferring a ResNet-18 model pre-trained on the ImageNet dataset to identify human and non-human motion based on WiFi signals, and compare this with the performance of the ResNet-18 model trained explicitly with WiFi signals. Furthermore, one can also examine the effect of fine-tuning different layers on the transfer performance.

As discussed above. SrcSense is a novel WiFi-based motion source recognition framework disclosed via signal-informed deep learning. In some embodiments, while prevailing intelligent systems grapple with interference stemming from non-human movements, SrcSense adeptly identifies a spectrum of non-human subjects, by leveraging a robust, environment-, location-, and direction-agnostic statistic, A-ACF, as the input of deep neural networks. Rigorous experiments conducted in diverse settings with an array of subjects scrutinize the performance of prominent deep learning models and the effectiveness of transfer learning. The disclosed evaluation results not only affirm the system's capability of motion source recognition with high accuracy in challenging scenarios but also offer insights into selecting appropriate deep learning models and transferring computer vision models for WiFi sensing tasks.

The following numbered clauses provide examples for wireless intrusion detection.

Clause C1. A system for wireless intrusion detection, comprising: a transmitter configured to transmit a wireless signal through a wireless channel of a venue; a receiver configured to receive the wireless signal through the wireless channel of the venue, wherein the received wireless signal differs from the transmitted wireless signal due to the wireless channel and a motion of an object when the object is in the venue; and a processor configured to: obtain a time series of channel information (TSCI) of the wireless channel based on the received wireless signal, compute a plurality of autocorrelation functions based on the TSCI, each autocorrelation function (ACF) computed based on CI of the TSCI in a sliding time window, generate rearranged ACF data based on the plurality of autocorrelation functions, extract motion features from the rearranged ACF data using a deep learning model, generate a classification result using a long short-term memory (LSTM) neural network based on the extracted motion features, and determine whether there is presence of an intrusion in the venue based on the classification result.

Clause C2. The system of clause C1, wherein the processor is configured to generate the rearranged ACF data based at least partially by: constructing at least one ACF vector, wherein each respective ACF vector is a vector associated with a respective ACF comprising multiple vector elements each associated with a respective time lag, each vector element being a value of the respective ACF evaluated at the respective time lag; and rearranging the at least one ACF vector into rearranged ACF data, wherein each ACF vector is a one-dimensional (1D) ACF-block.

Clause C3. The system of clause C2, wherein the processor is configured to generate the classification result based at least partially by: obtaining probability values generated from current and past rearranged ACF data based on the motion features; and inputting the probability values into the LSTM neural network.

Clause C4. The system of clause C3, wherein: the LSTM neural network comprises a plurality of LSTM units; and each of the plurality of LSTM units is a cell with a memory state, an input gate, an output gate and a forget gate.

Clause C5. The system of clause C4, wherein the processor is further configured to: generate a tuning dataset including motion segments from at least one unseen subject in a new environment; and fine-tune a residual block and a fully connected layer in the deep learning model using the tuning dataset based on few-shot learning to generate a tuned deep learning model.

Clause C6. The system of clause C5, wherein the processor is configured to generate the classification result based at least partially by: updating the motion features using the tuned deep learning model; and inputting the updated motion features into the LSTM neural network to generate the classification result.

Clause C7. A method for wireless intrusion detection, comprising: transmitting a wireless signal by a transmitter through a wireless channel of a venue; receiving the wireless signal by a receiver through the wireless channel of the venue, wherein the received wireless signal differs from the transmitted wireless signal due to the wireless channel and a motion of an object when the object is in the venue; obtaining a time series of channel information (TSCI) of the wireless channel based on the received wireless signal:

computing a plurality of autocorrelation functions based on the TSCI, each autocorrelation function (ACF) computed based on CI of the TSCI in a sliding time window; generating rearranged ACF data based on the plurality of autocorrelation functions: extracting motion features from the rearranged ACF data using a deep learning model: generating a classification result using a long short-term memory (LSTM) neural network based on the extracted motion features; and determining whether there is presence of an intrusion in the venue based on the classification result.

Clause C8. A device for wireless intrusion detection, comprising: a receiver configured to receive a wireless signal from a transmitter through a wireless channel of a venue, wherein the received wireless signal differs from the transmitted wireless signal due to the wireless channel and a motion of an object when the object is in the venue; and a processor configured to: obtain a time series of channel information (TSCI) of the wireless channel based on the received wireless signal, compute a plurality of autocorrelation functions based on the TSCI, each autocorrelation function (ACF) computed based on CI of the TSCI in a sliding time window, generate rearranged ACF data based on the plurality of autocorrelation functions, extract motion features from the rearranged ACF data using a deep learning model, generate a classification result using a long short-term memory (LSTM) neural network based on the extracted motion features, and determine whether there is presence of an intrusion in the venue based on the classification result.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files: such devices include magnetic disks, such as internal hard disks and removable disks: magneto-optical disks; and optical disks. Storage devices suitable for tangibly embodying computer program instructions and data include all forms of non-volatile memory, including by way of example semiconductor memory devices, such as EPROM, EEPROM, and flash memory devices: magnetic disks such as internal hard disks and removable disks: magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for wireless based occupancy detection, comprising:

a plurality of transmitters each of which is configured to transmit a respective wireless signal through a wireless channel of a venue;

a receiver configured to receive the respective wireless signal from each of the plurality of transmitters through the wireless channel of the venue, wherein the received wireless signal differs from the transmitted wireless signal due to the wireless channel and a motion of a user when the user is present in the venue; and a processor configured to:

obtain a plurality of time series of channel information (TSCI) of the wireless channel, wherein each of the plurality of TSCI is generated based on the received wireless signal from a respective transmitter of the plurality of transmitters, compute a plurality of autocorrelation function (ACF) segments based on the plurality of TSCI, wherein each of the plurality of ACF segments is computed based on CI of a respective TSCI of the plurality of TSCI, generate a plurality of feature maps using a first deep learning model that is shared by the plurality of ACF segments, wherein each of the plurality of ACF segments is input into the first deep learning model individually to generate a respective feature map of the plurality of feature maps, input the plurality of feature maps together into a second deep learning model to generate an aggregate representation that is independent of a quantity and locations of the plurality of transmitters, compute a probability of user presence based on the aggregate representation, and detect a presence of the user in the venue based on a threshold and the probability of user presence.

2. The system of claim 1, wherein the processor is configured to compute the plurality of ACF segments based at least partially by:

computing a time series of ACF (TSACF) based on each TSCI of the plurality of TSCI using a sliding time window; and constructing an ACF segment for each TSCI based on the TSACF, wherein the ACF segment has two dimensions including:

a first dimension representing a number of time instances in the sliding time window, and a second dimension representing a number of time lags at each time instance.

3. The system of claim 2, wherein:

the first deep learning model is a convolutional neural network;

the first deep learning model comprises a plurality of convolutional layers and at least one max-pooling layer;

a non-linear activation function is applied after each of the plurality of convolutional layers; and the first deep learning model, once being trained based on ACF data, is adaptive to any number of transmitters and any number of TSCI.

4. The system of claim 3, wherein each feature map of the plurality of feature maps is a combination of at least:

ACF features related to a moving motion of the user;

ACF features related to a breathing motion of the user;

ACF features related to a heartbeat motion of the user; and

ACF features related to a gait pattern of the user.

5. The system of claim 4, wherein:

the second deep learning model is trained based on a training dataset comprising sample ACF data and domain information representing an environment type associated with the venue;

the second deep learning model learns presence related behaviors with different sensitivity levels depending on the environment type; and the environment type associated with the venue indicates at least one of: an ownership type, an intended purpose, a structure, a size, a usage type, or amenities associated with the venue.

6. The system of claim 5, wherein:

the domain information is input into the second deep learning model as a conditioning token; and the second deep learning model is configured to compute attentions based on the conditioning token.

7. The system of claim 6, wherein:

the domain information is input into the second deep learning model by appending a domain embedding for each feature map of the plurality of feature maps based on feature-wise linear modulation.

8. The system of claim 5, wherein:

the domain information is input into the second deep learning model by concatenating the domain information with the aggregate representation.

9. The system of claim 5, wherein:

the second deep learning model is a transformer, wherein positional embeddings corresponding to locations and orders of devices in the venue are removed from the transformer; and the second deep learning model comprises:

a classification token which is a learnable embedding with a same dimensionality as each feature map and is configured to aggregate all information from the plurality of feature maps for presence detection, an attention map including attention heads configured to measure an importance of each feature map of the plurality of feature maps and assign a weight to the feature map based on the importance, and a dense layer configured to generate the aggregate representation based on a weighted combination of the plurality of feature maps output by the attention heads.

10. The system of claim 5, wherein:

the second deep learning model is a set transformer, wherein the set transformer is designed to apply independent of the quantity and locations of the plurality of transmitters; and the second deep learning model comprises:

a plurality of induced set attention block (ISAB) layers configured to learn device interactions through learned induced points based on attentions computed between the plurality of ISAB layers, and a pooling multi-head (PMA) attention layer configured to adaptively select most relevant transmitters from the plurality of transmitters and combine a set of embedding elements into the aggregate representation having a fixed size.

11. The system of claim 5, wherein the processor is configured to compute the probability of user presence based at least partially by:

inputting the aggregate representation into a classifier to compute a class probability, wherein the class probability represents a likelihood that there is any user present in the venue.

12. The system of claim 11, wherein the processor is configured to detect the presence of the user based at least partially by:

applying a median filter to the class probability to smooth out transient spikes which are considered noise or non-genuine occupancy events, wherein the median filter is configured to analyze the class probability over a time window to generate a smoothed class probability;

comparing the smoothed class probability with the threshold, wherein the threshold is predetermined based on a receiver operating characteristic (ROC) curve that is generated based on detection rates and false alarm rates associated with various thresholds; and detecting the presence of the user in the venue in accordance with a determination that the smoothed class probability is greater than the threshold.

13. The system of claim 12, wherein:

the user is one of: a human being, an animal, a living life, a robot, a moving tool, or a moving object controlled by artificial intelligence (AI).

14. The system of claim 13, wherein the processor is further configured to perform at least one of the following tasks based on a result of presence detection:

an energy control task comprising a control of heating, ventilation, air conditioning, lighting, or another application to reduce energy consumption; and a security task comprising identifying, noticing, alerting, or alarming an unauthorized presence in the venue.

15. A method for wireless based occupancy detection, comprising:

transmitting, by each of a plurality of transmitters, a respective wireless signal through a wireless channel of a venue;

receiving, by a receiver, the respective wireless signal from each of the plurality of transmitters through the wireless channel of the venue, wherein the received wireless signal differs from the transmitted wireless signal due to the wireless channel and a motion of a user when the user is present in the venue;

obtaining a plurality of time series of channel information (TSCI) of the wireless channel, wherein each of the plurality of TSCI is generated based on the received wireless signal from a respective transmitter of the plurality of transmitters;

computing a plurality of autocorrelation function (ACF) segments based on the plurality of TSCI, wherein each of the plurality of ACF segments is computed based on CI of a respective TSCI of the plurality of TSCI;

generating a plurality of feature maps using a first deep learning model that is shared by the plurality of ACF segments, wherein each of the plurality of ACF segments is input into the first deep learning model individually to generate a respective feature map of the plurality of feature maps;

inputting the plurality of feature maps together into a second deep learning model to generate an aggregate representation that is independent of a quantity and locations of the plurality of transmitters;

computing a probability of user presence based on the aggregate representation; and detecting a presence of the user in the venue based on a threshold and the probability of user presence.

16. The method of claim 15, wherein:

the first deep learning model is a convolutional neural network;

the first deep learning model comprises a plurality of convolutional layers and at least one max-pooling layer;

a non-linear activation function is applied after each of the plurality of convolutional layers;

the first deep learning model, once being trained based on ACF data, is adaptive to any number of transmitters and any number of TSCI;

the second deep learning model is trained based on a training dataset comprising sample ACF data and domain information representing an environment type associated with the venue; and the second deep learning model learns presence related behaviors with different sensitivity levels depending on the environment type.

17. The method of claim 16, wherein:

the second deep learning model is a transformer, wherein positional embeddings corresponding to locations and orders of devices in the venue are removed from the transformer; and the second deep learning model comprises:

a classification token which is a learnable embedding with a same dimensionality as each feature map and is configured to aggregate all information from the plurality of feature maps for presence detection, an attention map including attention heads configured to measure an importance of each feature map of the plurality of feature maps and assign a weight to the feature map based on the importance, and a dense layer configured to generate the aggregate representation based on a weighted combination of the plurality of feature maps output by the attention heads.

18. The method of claim 16, wherein:

the second deep learning model is a set transformer, wherein the set transformer is designed to apply independent of the quantity and locations of the plurality of transmitters; and the second deep learning model comprises:

a plurality of induced set attention block (ISAB) layers configured to learn device interactions through learned induced points based on attentions computed between the plurality of ISAB layers, and a pooling multi-head (PMA) attention layer configured to adaptively select most relevant transmitters from the plurality of transmitters and combine a set of embedding elements into the aggregate representation having a fixed size.

19. The method of claim 16, wherein:

computing the probability of user presence comprises inputting the aggregate representation into a classifier to compute a class probability, wherein the class probability represents a likelihood that there is any user present in the venue; and detecting the presence of the user comprises:

applying a median filter to the class probability to smooth out transient spikes which are considered noise or non-genuine occupancy events, wherein the median filter is configured to analyze the class probability over a time window to generate a smoothed class probability, comparing the smoothed class probability with the threshold, wherein the threshold is predetermined based on a receiver operating characteristic (ROC) curve that is generated based on detection rates and false alarm rates associated with various thresholds, and detecting the presence of the user in the venue in accordance with a determination that the smoothed class probability is greater than the threshold.

20. A device for wireless based occupancy detection, comprising:

a receiver configured to receive a respective wireless signal from each of a plurality of transmitters through a wireless channel of a venue, wherein the received wireless signal differs from the transmitted wireless signal due to the wireless channel and a motion of a user when the user is present in the venue; and a processor configured to:

obtain a plurality of time series of channel information (TSCI) of the wireless channel, wherein each of the plurality of TSCI is generated based on the received wireless signal from a respective transmitter of the plurality of transmitters;

compute a plurality of autocorrelation function (ACF) segments based on the plurality of TSCI, wherein each of the plurality of ACF segments is computed based on CI of a respective TSCI of the plurality of TSCI;

generate a plurality of feature maps using a first deep learning model that is shared by the plurality of ACF segments, wherein each of the plurality of ACF segments is input into the first deep learning model individually to generate a respective feature map of the plurality of feature maps;

input the plurality of feature maps together into a second deep learning model to generate an aggregate representation that is independent of a quantity and locations of the plurality of transmitters;

compute a probability of user presence based on the aggregate representation; and detect a presence of the user in the venue based on a threshold and the probability of user presence.

* * * * *